US00RE48546E

(19) United States
(12) Reissued Patent
Clarke et al.

(10) Patent Number: US RE48,546 E
(45) Date of Reissued Patent: May 4, 2021

(54) SYSTEM AND METHOD FOR PRESENTING CONTENT WITH TIME BASED METADATA

(71) Applicant: Comcast Cable Communications, LLC, Philadelphia, PA (US)

(72) Inventors: Douglas Clarke, Oakland, CA (US); Michael Dalrymple, San Francisco, CA (US); Edward Lee Elliott, San Francisco, CA (US); John Fox, San Francisco, CA (US); Mark Johnson, Pasadena, CA (US); Darren Lepke, San Francisco, CA (US); Thomas Purnell-Fisher, San Francisco, CA (US); Herve Utheza, San Francisco, CA (US); Zane Vella, San Francisco, CA (US); Ole Lutjens, San Francisco, CA (US)

(73) Assignee: COMCAST CABLE COMMUNICATIONS, LLC, Philadelphia, PA (US)

(21) Appl. No.: 16/567,246

(22) Filed: Sep. 11, 2019

Related U.S. Patent Documents

Reissue of:
(64) Patent No.: 9,762,967
Issued: Sep. 12, 2017
Appl. No.: 13/523,829
Filed: Jun. 14, 2012

U.S. Applications:
(60) Provisional application No. 61/497,023, filed on Jun. 14, 2011.

(51) Int. Cl.
*H04N 21/4722* (2011.01)
*G06F 16/432* (2019.01)
(Continued)

(52) U.S. Cl.
CPC ..... *H04N 21/4722* (2013.01); *G06F 16/433* (2019.01); *G06F 16/48* (2019.01);
(Continued)

(58) Field of Classification Search
CPC .. G11B 2020/10537; G11B 2020/2541; H04N 21/4394; H04N 21/854;
(Continued)

(56) References Cited

U.S. PATENT DOCUMENTS 6,188,398 B1 2/2001 Collins-Rector et al.
6,317,784 B1 11/2001 Mackintosh et al.
(Continued)

FOREIGN PATENT DOCUMENTS

CA 2973717 A1 1/2018
EP 3270600 A1 1/2018
(Continued)

OTHER PUBLICATIONS

U.S. Appl. No. 15/929,300, filed Apr. 23, 2020, entitled "Interface for Displaying Supplemental Dynamic Timeline Content".
(Continued)

*Primary Examiner* — Jalatee Worjloh
(74) *Attorney, Agent, or Firm* — BakerHostetler

(57) ABSTRACT

Disclosed herein is a system and method for rendering media related content and web services. According to one or more embodiments, media content is rendered from a source. In one or more segments of the media source, at least one of an object, person or location is identified and additional information, relevant content or services about the person, object or location are displayed or made accessible while or after the media content is being rendered, on one or more devices and/or on one or more paired devices.

20 Claims, 20 Drawing Sheets

(51) Int. Cl.

| | |
|---|---|
| ***G06F 16/48*** | (2019.01) |
| ***G11B 27/10*** | (2006.01) |
| ***G11B 27/11*** | (2006.01) |
| ***H04N 21/431*** | (2011.01) |
| ***H04N 21/439*** | (2011.01) |
| ***H04N 21/44*** | (2011.01) |
| ***H04N 21/81*** | (2011.01) |
| ***H04N 21/854*** | (2011.01) |
| ***G11B 20/10*** | (2006.01) |

(52) U.S. Cl.
CPC ..... *G11B 27/105* (2013.01); *G11B 27/11* (2013.01); *H04N 21/4316* (2013.01); *H04N 21/4394* (2013.01); *H04N 21/44008* (2013.01); *H04N 21/8133* (2013.01); *H04N 21/854* (2013.01); *G11B 2020/10537* (2013.01); *G11B 2220/2541* (2013.01)

(58) Field of Classification Search
CPC ..... H04N 21/4722; H04N 21/44008; H04N 21/8133; H04N 21/4316; G06F 16/48
See application file for complete search history.

(56) References Cited

U.S. PATENT DOCUMENTS 6,357,042 B2 * 3/2002 Srinivasan et al. ..... 725/32
6,415,326 B1 7/2002 Gupta et al.
6,741,977 B1 5/2004 Nagaya et al.
6,874,126 B1 3/2005 Lapidous
7,096,271 B1 8/2006 Omoigui et al.
7,136,871 B2 11/2006 Ozer et al.
7,302,490 B1 11/2007 Gupta et al.
7,379,661 B2 5/2008 Lamkin et al.
7,415,529 B2 8/2008 Saunders et al.
7,421,729 B2 9/2008 Zenoni
7,428,696 B2 9/2008 Shin
7,472,198 B2 12/2008 Gupta et al.
7,757,254 B2 7/2010 Shoff et al.
7,788,262 B1 8/2010 Shirwadkar
7,913,157 B1 3/2011 Stoakley et al.
8,042,132 B2 10/2011 Carney et al.
8,220,018 B2 7/2012 De et al.
8,230,343 B2 7/2012 Logan et al.
8,359,399 B2 1/2013 Landow et al.
8,381,259 B1 2/2013 Khosla
8,385,633 B2 2/2013 Gokturk et al.
8,413,205 B2 4/2013 Carney et al.
8,448,208 B2 5/2013 Moreau et al.
8,549,575 B2 10/2013 Amento et al.
8,595,781 B2 11/2013 Neumeier et al.
8,635,649 B2 1/2014 Ward et al.
8,681,822 B2 3/2014 Bradley et al.
8,699,862 B1 4/2014 Sharifi et al.
8,701,005 B2 4/2014 Bedingfield, Sr.
8,719,869 B2 5/2014 Kudelski et al.
8,737,813 B2 5/2014 Berkowitz et al.
8,763,060 B2 6/2014 Jerremy
8,775,945 B2 7/2014 Jones et al.
8,776,108 B2 7/2014 Barsook et al.
8,793,256 B2 7/2014 McIntire et al.
8,850,495 B2 9/2014 Pan
8,898,698 B2 11/2014 Fleischman et al.
8,943,533 B2 1/2015 De et al.
9,154,852 B2 10/2015 Huber et al.
9,191,722 B2 11/2015 Alexander et al.
9,294,727 B2 3/2016 Steelberg et al.
9,432,721 B2 8/2016 Fleischman et al.
9,554,093 B2 1/2017 Hua et al.
9,594,957 B2 3/2017 Tanaka et al.
9,674,562 B1 * 6/2017 Spracklen ..... H04N 21/4622
9,762,967 B2 9/2017 Clarke et al.
9,814,977 B2 11/2017 Stafford et al.
9,832,532 B1 11/2017 Agabob et al.
9,911,126 B2 3/2018 Morten et al.
9,922,334 B1 3/2018 Rothman
10,061,742 B2 8/2018 Lang et al.
10,528,631 B1 1/2020 Nordhagen
10,579,215 B2 3/2020 Leatham
10,708,336 B2 7/2020 Bowen
2001/0001160 A1 5/2001 Shoff et al.
2002/0042920 A1 * 4/2002 Thomas et al. ..... 725/87
2002/0053078 A1 5/2002 Holtz et al.
2002/0064149 A1 5/2002 Elliott et al.
2002/0073424 A1 6/2002 Ward et al.
2002/0104101 A1 * 8/2002 Yamato ..... H04H 60/37 725/139
2002/0112249 A1 * 8/2002 Hendricks et al. ..... 725/136
2002/0120925 A1 8/2002 Logan
2002/0120933 A1 8/2002 Knudson et al.
2002/0131511 A1 9/2002 Zenoni
2002/0162117 A1 * 10/2002 Pearson ..... H04N 5/445 725/109
2002/0188628 A1 12/2002 Cooper et al.
2003/0001880 A1 1/2003 Holtz et al.
2003/0012548 A1 * 1/2003 Levy ..... G06F 21/125 386/251
2003/0033157 A1 2/2003 Dempski et al.
2003/0067554 A1 4/2003 Klarfeld et al.
2003/0093790 A1 5/2003 Logan et al.
2003/0093792 A1 5/2003 Labeeb et al.
2003/0101454 A1 5/2003 Ozer et al.
2003/0126200 A1 7/2003 Wolff
2003/0229900 A1 * 12/2003 Reisman ..... 725/87
2004/0003400 A1 1/2004 Carney et al.
2004/0031058 A1 2/2004 Reisman
2004/0226051 A1 11/2004 Carney et al.
2004/0260682 A1 12/2004 Herley et al.
2005/0015815 A1 1/2005 Shoff et al.
2005/0038794 A1 * 2/2005 Piersol ..... H04N 21/8455
2005/0050218 A1 3/2005 Sheldon
2005/0060741 A1 3/2005 Tsutsui et al.
2005/0125428 A1 6/2005 Kang et al.
2005/0188402 A1 8/2005 De et al.
2005/0235318 A1 10/2005 Grauch et al.
2006/0015908 A1 1/2006 Vermola et al.
2006/0174310 A1 8/2006 Lee et al.
2006/0190336 A1 8/2006 Pisaris-Henderson et al.
2007/0011050 A1 1/2007 Klopf et al.
2007/0061838 A1 3/2007 Grubbs et al.
2007/0088609 A1 4/2007 Reller et al.
2007/0124756 A1 * 5/2007 Covell ..... G06F 17/30743 725/18
2007/0124789 A1 5/2007 Sachson et al.
2007/0127720 A1 6/2007 White
2007/0250761 A1 10/2007 Bradley et al.
2007/0274676 A1 11/2007 Diomelli et al.
2008/0017722 A1 1/2008 Snyder et al.
2008/0036917 A1 * 2/2008 Pascarella ..... H04N 21/854 348/702
2008/0066100 A1 3/2008 Brodersen et al.
2008/0066110 A1 3/2008 Brodersen et al.
2008/0068500 A1 3/2008 Krause
2008/0113789 A1 5/2008 Canessa et al.
2008/0168133 A1 7/2008 Osborne
2008/0195746 A1 8/2008 Bowra et al.
2008/0209485 A1 8/2008 Emura
2008/0249853 A1 10/2008 Dekel et al.
2008/0255904 A1 10/2008 Park et al.
2008/0267588 A1 10/2008 Iwase et al.
2008/0301727 A1 12/2008 Cristofalo et al.
2008/0307454 A1 12/2008 Ahanger et al.
2008/0313229 A1 12/2008 Taswell
2009/0006191 A1 1/2009 Arankalle et al.
2009/0041418 A1 * 2/2009 Candelore ..... G06F 17/30743 386/341
2009/0044246 A1 2/2009 Sheehan et al.
2009/0113468 A1 4/2009 Steelberg et al.
2009/0125812 A1 5/2009 Blinnikka et al.
2009/0132371 A1 5/2009 Strietzel et al.
2009/0150215 A1 6/2009 Kalb et al.
2009/0150947 A1 * 6/2009 Soderstrom ..... 725/93
2009/0171948 A1 7/2009 Solomon et al.

(56) References Cited

U.S. PATENT DOCUMENTS

2009/0204481 A1* 8/2009 Navar et al. ..... 705/10
2009/0216745 A1 8/2009 Allard
2009/0226152 A1 9/2009 Hanes
2009/0234815 A1 9/2009 Boerries et al.
2009/0235298 A1 9/2009 Carlberg et al.
2009/0240564 A1 9/2009 Boerries et al.
2009/0240734 A1 9/2009 Lloyd-Jones et al.
2009/0245058 A1 10/2009 Goto et al.
2009/0276821 A1 11/2009 Amento et al.
2009/0285550 A1 11/2009 Yamada et al.
2009/0295993 A1 12/2009 Chhokra
2009/0307227 A1 12/2009 Prestenback et al.
2010/0011392 A1 1/2010 Bronstein et al.
2010/0031299 A1 2/2010 Harrang et al.
2010/0064311 A1* 3/2010 Cooper ..... 725/36
2010/0070643 A1 3/2010 Puranik et al.
2010/0083306 A1 4/2010 Dempski et al.
2010/0088716 A1 4/2010 Ellanti et al.
2010/0106798 A1 4/2010 Barreto et al.
2010/0118206 A1 5/2010 Gao et al.
2010/0135637 A1 6/2010 McDermott et al.
2010/0142915 A1 6/2010 McDermott et al.
2010/0146542 A1 6/2010 Weihs et al.
2010/0158099 A1* 6/2010 Kalva et al. ..... 375/240.01
2010/0161825 A1 6/2010 Ronca et al.
2010/0162286 A1 6/2010 Berry
2010/0169303 A1 7/2010 Biderman et al.
2010/0169460 A1 7/2010 Angell et al.
2010/0169910 A1 7/2010 Collins et al.
2010/0180289 A1 7/2010 Barsook et al.
2010/0205049 A1 8/2010 Long et al.
2010/0228693 A1 9/2010 Dawson et al.
2010/0235472 A1 9/2010 Sood et al.
2010/0241961 A1 9/2010 Peterson et al.
2010/0241962 A1 9/2010 Peterson et al.
2010/0246666 A1 9/2010 Miazzo et al.
2010/0274667 A1 10/2010 Lanham et al.
2010/0287580 A1 11/2010 Harding et al.
2010/0299687 A1 11/2010 Bertino-Clarke
2010/0333152 A1 12/2010 Redmann et al.
2011/0044601 A1 2/2011 Lee et al.
2011/0058675 A1 3/2011 Brueck et al.
2011/0061001 A1 3/2011 Jones et al.
2011/0078623 A1 3/2011 Liu et al.
2011/0099225 A1 4/2011 Osborne
2011/0134321 A1 6/2011 Berry et al.
2011/0178854 A1 7/2011 Sofer et al.
2011/0196747 A1 8/2011 Karidi et al.
2011/0218851 A1 9/2011 O'Hanlon
2011/0246622 A1 10/2011 Pantos et al.
2011/0246885 A1 10/2011 Pantos et al.
2011/0258529 A1 10/2011 Doig et al.
2011/0258545 A1 10/2011 Hunter
2011/0273455 A1* 11/2011 Powar ..... G10H 1/368 345/473
2011/0276372 A1 11/2011 Spivack et al.
2011/0319160 A1 12/2011 Arn et al.
2011/0321096 A1 12/2011 Landow et al.
2012/0102042 A1 4/2012 Flick et al.
2012/0110627 A1 5/2012 Reitmeier et al.
2012/0116883 A1 5/2012 Asam et al.
2012/0144417 A1 6/2012 Khader et al.
2012/0158472 A1 6/2012 Singh et al.
2012/0167146 A1* 6/2012 Incorvia ..... 725/60
2012/0179536 A1 7/2012 Kalb et al.
2012/0192220 A1 7/2012 Wyatt et al.
2012/0192225 A1 7/2012 Harwell et al.
2012/0192227 A1 7/2012 Fleischman et al.
2012/0197419 A1 8/2012 Dhruv et al.
2012/0203589 A1 8/2012 Eggena et al.
2012/0233646 A1 9/2012 Coniglio et al.
2012/0256762 A1 10/2012 Greenberger
2012/0290644 A1 11/2012 Gabin et al.
2012/0310750 A1 12/2012 Schutzbank et al.
2013/0011120 A1 1/2013 Tanaka et al.
2013/0014155 A1 1/2013 Clarke et al.
2013/0024906 A9 1/2013 Carney et al.
2013/0036007 A1 2/2013 Lau et al.
2013/0070152 A1 3/2013 Berkowitz et al.
2013/0071090 A1 3/2013 Berkowitz et al.
2013/0074141 A1 3/2013 Hwang et al.
2013/0077876 A1 3/2013 Tanaka et al.
2013/0091518 A1 4/2013 Trainor
2013/0095864 A1 4/2013 Marovets
2013/0097190 A1 4/2013 Shah
2013/0104179 A1 4/2013 Shah
2013/0132818 A1 5/2013 Anders et al.
2013/0132854 A1 5/2013 Raleigh et al.
2013/0170753 A1 7/2013 Tanaka et al.
2013/0170813 A1 7/2013 Woods et al.
2013/0176493 A1 7/2013 Khosla
2013/0183021 A1 7/2013 Osman
2013/0191745 A1 7/2013 Vella et al.
2013/0198642 A1 8/2013 Carney et al.
2013/0204698 A1 8/2013 Bryant et al.
2013/0254340 A1 9/2013 Lang et al.
2013/0262997 A1 10/2013 Markworth et al.
2013/0293677 A1 11/2013 Lee et al.
2013/0332839 A1 12/2013 Frazier et al.
2013/0347018 A1 12/2013 Limp et al.
2014/0009680 A1 1/2014 Moon et al.
2014/0046775 A1 2/2014 Harb
2014/0089967 A1 3/2014 Mandalia et al.
2014/0149918 A1 5/2014 Asokan et al.
2014/0157307 A1 6/2014 Cox
2014/0180829 A1 6/2014 Umeda
2014/0181868 A1 6/2014 O'Callaghan
2014/0310243 A1 10/2014 McGee et al.
2014/0327677 A1 11/2014 Walker
2014/0337127 A1 11/2014 Morel et al.
2014/0365302 A1 12/2014 Walker
2015/0003798 A1 1/2015 Walker
2015/0019644 A1 1/2015 Walker
2015/0020096 A1 1/2015 Walker
2015/0134673 A1 5/2015 Golan et al.
2015/0135206 A1 5/2015 Reisman
2015/0135214 A1 5/2015 Reisman
2015/0199968 A1 7/2015 Singhal et al.
2015/0237386 A1 8/2015 Sheehan et al.
2015/0237389 A1 8/2015 Grouf et al.
2015/0245111 A1 8/2015 Berry et al.
2015/0281763 A1 10/2015 Bertrand et al.
2015/0289030 A1 10/2015 Roberts et al.
2016/0127776 A1 5/2016 Zilberstein et al.
2016/0182923 A1 6/2016 Higgs et al.
2016/0191957 A1 6/2016 Teixeira et al.
2016/0234295 A1 8/2016 Ziring et al.
2017/0013314 A1* 1/2017 Mallinson ..... H04N 21/4722
2017/0041644 A1 2/2017 Dalrymple et al.
2017/0041648 A1 2/2017 Dalrymple et al.
2017/0041649 A1 2/2017 Dalrymple et al.
2017/0201850 A1 7/2017 Raleigh et al.
2017/0295386 A1 10/2017 Owen et al.
2017/0339462 A1 11/2017 Clarke et al.
2017/0344439 A1 11/2017 Howe
2018/0014077 A1 1/2018 Hou et al.
2019/0107906 A1 4/2019 Berry et al.
2019/0349619 A1 11/2019 Hou
2020/0068256 A1 2/2020 Gordon

FOREIGN PATENT DOCUMENTS

WO 2012/094432 A1 7/2012
WO 2012/094539 A2 7/2012
WO 2012/174301 A1 12/2012

OTHER PUBLICATIONS

International Search Report and Written Opinion, International Application No. PCT/US2012/020239, dated Apr. 24, 2012, 9 Pages.

(56) References Cited

OTHER PUBLICATIONS

International Search Report and Written Opinion, International Application No. PCT/US2012/020387, dated Jul. 10, 2012, 11 Pages.
International Search Report and Written Opinion, International Application No. PCT/US2012/042541, dated Aug. 31, 2012, 9 Pages.
Non-Office Action dated Jul. 18, 2013, for related U.S. Appl. No. 13/343,683, filed Jan. 4, 2012, 15 pages.
Non-Office Action dated Jun. 5, 2013, for related U.S. Appl. No. 13/344,579, filed Jan. 5, 2012, 25 pages.
U.S. Appl. No. 61/631,814, filed Jan. 10, 2012, entitled "Interface for Displaying Supplemental Dynamic Timeline Content".
U.S. Appl. No. 61/497,023, filed Jun. 14, 2011, entitled "System and Method for Presenting Content with Time Based Metadata".
U.S. Appl. No. 62/362,587, filed Jul. 14, 2016, entitled "Metadata Delivery System for Rendering Supplementary Content".
U.S. Appl. No. 62/366,540, filed Jul. 25, 2016, entitled "System to Select Supplemental Content for Playback Devices".
U.S. Appl. No. 15/331,815, filed Oct. 22, 2016, entitled "Supplemental Content Playback System".

* cited by examiner

612

622

624

626

910

900

SYSTEM AND METHOD FOR PRESENTING CONTENT WITH TIME BASED METADATA

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

RELATED APPLICATIONS

This application *is a reissue of U.S. patent application Ser. No. 13/523,829, filed Jun. 14, 2012, and issued as U.S. Pat. No. 9,762,967 on Sep. 12, 2017, which* claims benefit of priority to Provisional U.S. Patent Application No. 61/497,023, filed Jun. 14, 2011; the aforementioned priority [application] *applications* being hereby incorporated by reference for all purposes.

TECHNICAL FIELD

Embodiments described herein pertain generally to a system and method for presenting content, and more specifically, a system and method for presenting content with time based metadata.

DETAILED DESCRIPTION

Figure 1A:
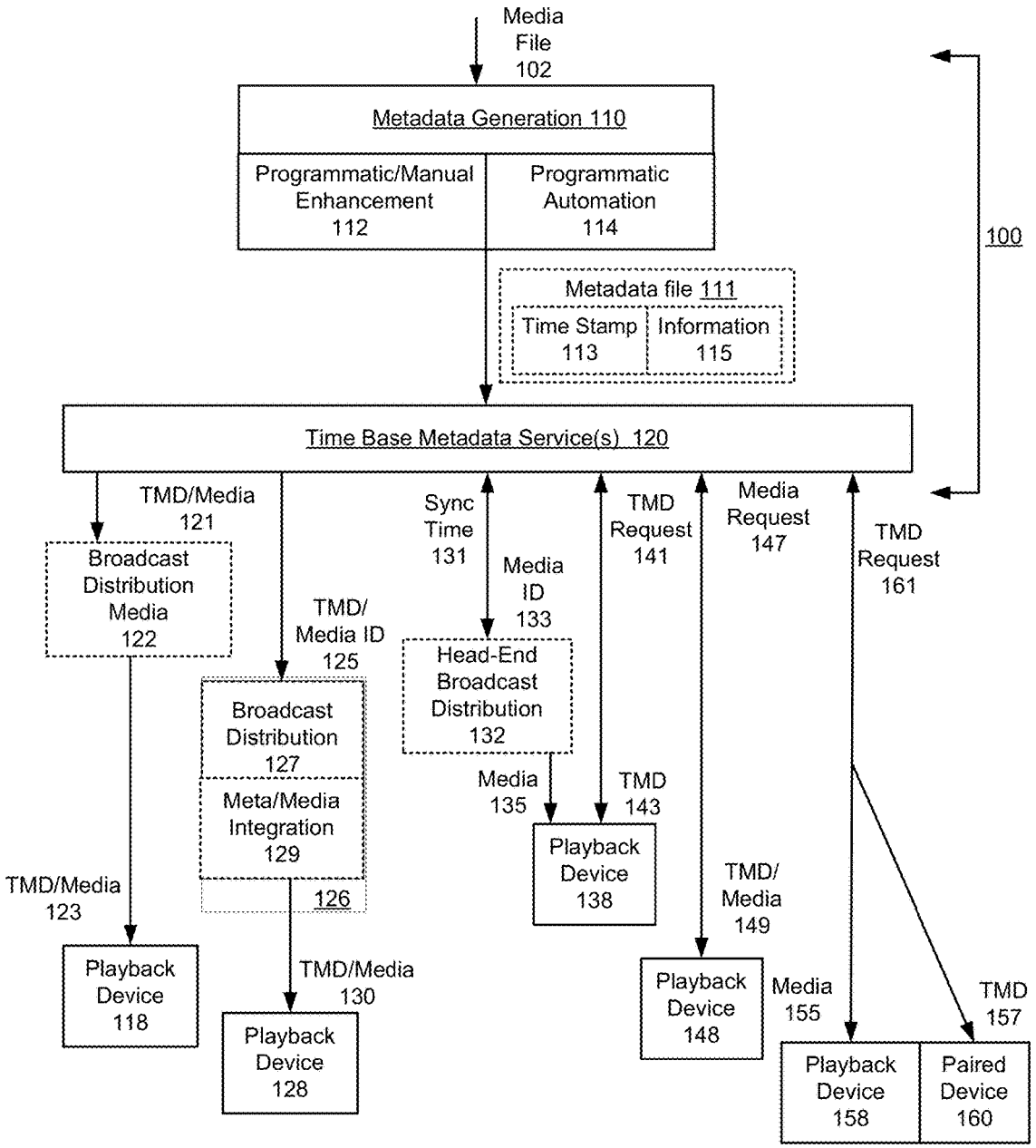
FIG. 1A-1D illustrate systems for including time based metadata information as a form of supplemental content in connection with the presentation of media content, according to one or more embodiments.

Embodiments described herein include a service that enables devices to utilize various web services independent of the communication protocol and format utilized by the devices.

In particular, devices that are capable of media playback and/or web browsing typically use communication protocols such as XML, EBIF (set-top boxes), REST or JSON. For such devices, content publishers make available various forms of content, often to supplement or augment the user's playback and/or web browsing experience. For example, cinematic studios often publish movie previews and bonus clips on websites, which can be downloaded and viewed by a device that uses an XML communication format (e.g. ANDROID device), EBIF (set-top box) or JSON. Under conventional approaches, the content publishers are required to address the various communication protocols and formats used by the various devices individually. In contrast, embodiments described herein include a service that is capable of interfacing a device using any of multiple possible communication protocols with a web service that may or may not handle the particular communication protocol in question.

Moreover, under embodiments described, the web service providers may update functionality and content provided without having to address various possible communication protocols that are in use. Accordingly, otherwise incompatible devices that normally would not communicate with each other may be able to connect, communicate and/or share information.

As used herein, BD refers to Blu-ray Disc®, and BD specification refers to the various documents that define the behavior and requirements of BD players, software and related systems, and, in particular, "System Description Blu-ray Disc Read-Only Format: Part 3. Audio Visual Basic Specifications". The BD specification includes a section pertaining to virtual file system ("VFS") updates.

In some embodiments, reference is made to playback devices that operate as a Blu-ray player. A Blu-ray player generally supports a virtual file system (VFS) that utilizes files located on an optical disc itself, as well as files that reside in a local storage area of the playback device. The Blu-ray environment generally permits updates to the environment by way of new files and content. With reference to embodiments described herein, a Blu-ray player is able to retrieve information and data from a network, under programmatic instructions that originate from logic or software operating on the player, as well as those executing with the disc. In such implementations, the Blu-ray player may be configured to access and retrieve metadata for presentation in connection with media content that is provided at least in part from the optical disc. In this way, the original contents and functionality of the optical disc can be augmented through the addition of content, namely, audio and video files, application files, or data files, such as those downloaded from a network server. Information that updates the playback environment of the player is received through the VFS of the playback device. With further reference to the Blu-ray environment, the service may perform functions, such as dynamically generating a manifest for the data communicated to the player, as well as a digital signature that is sufficiently in compliance with Blu-ray Specifications (e.g. See System Description Blu-ray Disc Read-Only Format: Part Audio Visual Basic Specifications"). In a Blu-ray platform the manifest defines modifications that are to be made to a file system in the playback device. More specifically, the manifest file maps files located on the Blu-ray disc and in local storage to their relative positions and names in the virtual file system.

One or more embodiments described herein provide that methods, techniques and actions performed by a computing device are performed programmatically, or as a computer-implemented method. Programmatically means through the use of code, or computer-executable instructions. A programmatically performed step may or may not be automatic.

One or more embodiments described herein may be implemented using programmatic modules or components. A programmatic module or component may include a program, a subroutine, a portion of a program, or a software component or a hardware component capable of performing one or more stated tasks or functions. As used herein, a module or component can exist on a hardware component independently of other modules or components. Alternatively, a module or component can be a shared element or process of other modules, programs or machines.

Furthermore, one or more embodiments described herein may be implemented through the use of instructions that are executable by one or more processors. These instructions may be carried on a computer-readable medium. Machines shown or described with figures below provide examples of processing resources and computer-readable mediums on which instructions for implementing embodiments of the invention can be carried and/or executed. In particular, the numerous machines shown with embodiments of the invention include processor(s) and various forms of memory for holding data and instructions. Examples of computer-readable mediums include permanent memory storage devices, such as hard drives on personal computers or servers. Other examples of computer storage mediums include portable storage units, such as CD or DVD units, flash memory (such as carried on many cell phones and personal digital assistants (PDAs)), and magnetic memory. Computers, terminals, network enabled devices (e.g. mobile devices such as cell phones) are all examples of machines and devices that utilize processors, memory, and instructions stored on computer-readable mediums. Additionally, embodiments may be implemented in the form of computer-programs, or a computer usable carrier medium capable of carrying such a program.

System Description

FIGS. 1A-1D illustrate a system for including time based metadata information as a form of supplemental content in connection with the presentation of media content, according to one or more embodiments. Each of the embodiments described with respect to FIG. 1A-FIG. 1D, including components and programmatic processes described with each embodiment, may be used individually or in combination with one another. In particular, embodiments described herein enable the rendering of content, such as movies and/or television programs, to be enhanced with the display of relevant metadata information that pertains to events that are part of the content being watched. For example, the appearance of an actor in the movie or program may be supplemented with relevant metadata information that includes the name of the actor who is playing the character, as well as additional information about the actor or character. Likewise, (i) the presence of objects that appear in the content may be highlighted by metadata, particularly as to commercial products; (ii) the use of locations in the content may also be supplemented with information about such location; or (iii) music and/or a soundtrack playing in the audio background or as the primary audio track may be supplemented with metadata. Numerous other examples are provided herein for enhancing or supplementing the presentation of content, such as provided by movies and programs, with metadata information regarding the events that occur as part of the content being watched.

As used herein, metadata, in the context of movies and programs, refers to information and content that is displayed to the user, but which is not part of the content itself. Rather, such metadata is delivered to the user watching the movie or program as an additional or independent layer.

In FIG. 1A, system 100 is described in the context of multiple operational environments. According to embodiments, a system 100 may be operational in one or more of the operational environments described.

System 100 includes metadata generation subsystem 110 and time metadata service (or services) 120. The metadata generation subsystem 110 processes media files 102 corresponding to movies and/or programs. The output of the metadata generation 110 includes a metadata file 111, which includes a combination of time stamps 113 and associated information 115. The metadata file 111 includes the time stamps 113 by which the sync time triggers 131 can be programmatically or automatically activated by a playback device in order to cause the rendering of associated information or content items for a particular trigger.

Within the structure of the timeline for the media file, the time stamps 113 are timed to coincide with the occurrence of a particular event in the media content. Each time stamp 113 may signify the beginning of an event, and last for a duration that coincides with the ending of the event. For example, the introduction of an actor into a scene may signify the beginning of a particular time stamp 113, and the actor's exit from the scene may signify the end of the event associated with the time stamp 113. Similarly, a time stamp 113 may be associated when music or a particular song is played in the background of the media content, and a time stamp 113 may have the duration equivalent to the length of the song (e.g., the duration of time the music is playing). One frame or series of frames in the media content can be associated with multiple time stamps 113. Furthermore, each time stamp 113 is associated with a corresponding item of information or content 115. Such information or content 115 can be displayed over the movie/program content on a playback device, or on a separate, paired device, as a mechanism for providing the viewer with additional information.

In some variations, the information and content displayed to the user can be interactive. For example, the user may select a link presented with the information or content item 115 as a mechanism for viewing additional information, or partaking in a supplemental activity (e.g. make online purchase).

In order to generate the metadata file 111, one or more embodiments may include a combination of manual and programmatic resources comprising the metadata generation system 110. In one embodiment, a programmatic/manual enhancement 112 component may be used to facilitate operators to identify time stamps 113, and associated information or content 115. With reference to an embodiment of FIG. 8, the programmatic manual enhancement 112 may include a user interface tool 800 that displays a general timeline 812 for a particular movie or program (e.g. the "Incredibles"). In an embodiment depicted, the user interface tool 800 enables an operator to create events for scenes of the media content. The events may correspond to an actor, playing a role in the content, appearing in a scene of the media content.

The user interface tool 800 may also include one or more event columns 814. For example, the event columns 814 may include a list of actors, as well as other events relating to the media content.

Figure 8:
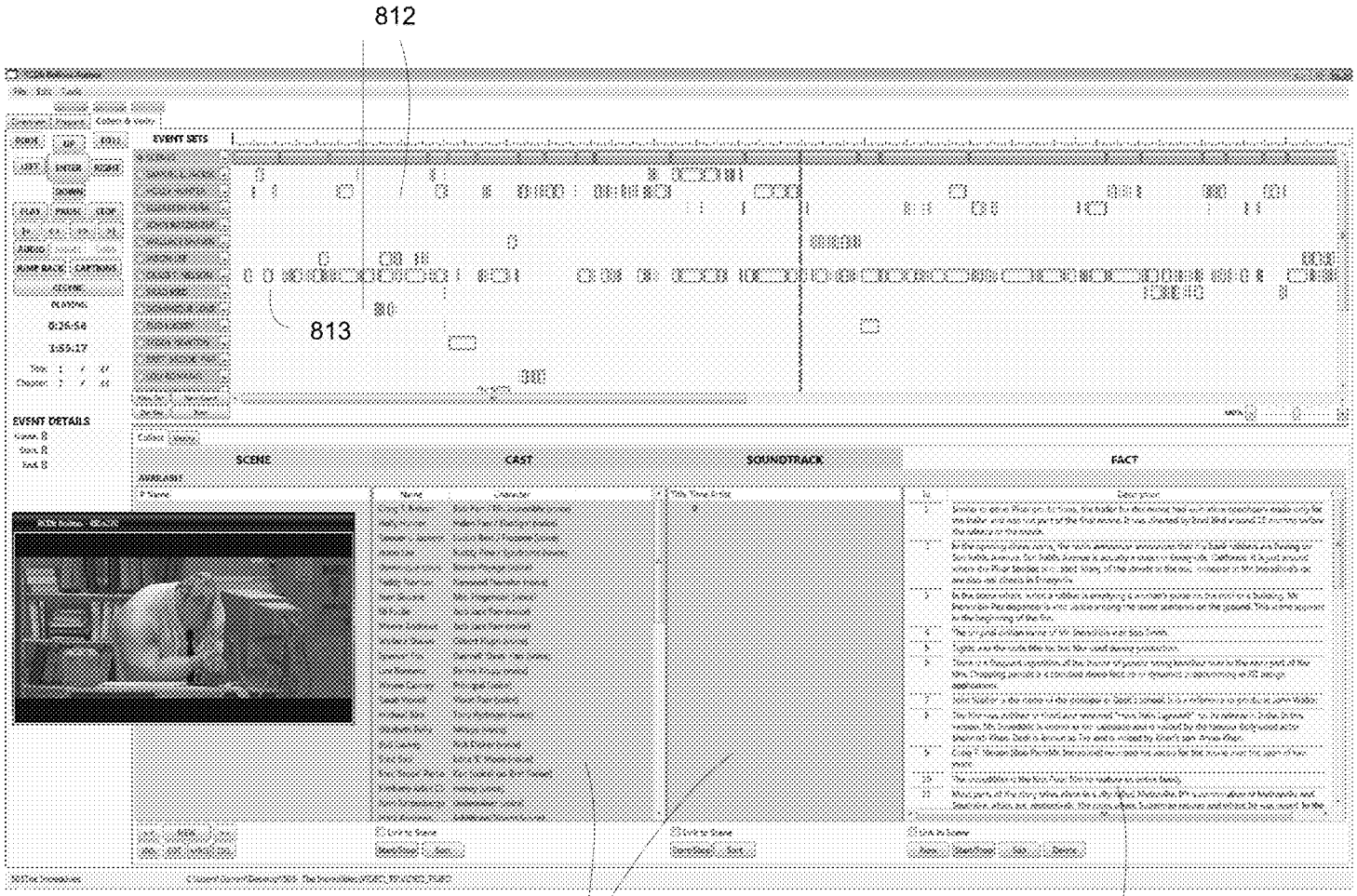
FIG. 8 through FIG. 9C illustrate various interface tools for facilitating different metadata placement or selection operators in generating metadata for a media content, according to an embodiment.

As also shown in FIG. 8, the timeline 812 extends horizontally relative to the event columns 814. Within the timeline 812, various time stamps 813 are identified by the operator each of which corresponds to one or more events in the event column. Each time stamp 813 is represented by brackets that can vary in dimension to represent a duration of the time stamp 813 over the course of the timeline 812. In one implementation, an operator is enabled to (i) view a given scene or frame; (ii) view the exact time within the timeline in which the scene takes place; and (iii) have the ability to add new events, as well as to associate a particular senior time stamp 813 within an existing event in the event column 814.

According to some embodiments, the metadata generation subsystem 110 can also include programmatic resources to automate the generation of some or all of the metadata. In particular, programmatic automation 114 may be used to identify some or all of the time stamps 113, as well as to generate some or all of the information or content items associated with individual time stamps 113. In one implementation, the programmatic automation 114 uses a script for the media content in order to determine when events occur in the media content (e.g. the introduction of a character into a scene), what the event pertains to (e.g. the character involved), and what the associated information or content item 115 should include (e.g. the name of actor who plays the character of the event). As an alternative or addition to the script, closed-captioned text associated with the media content can be similarly used.

Still further, some embodiments may use image analysis to identify persons or objects appearing in the content. For example, individual frames of the media content may be analyzed for faces, which are then compared to a facial recognition database of actors, in order to determine who the actor is that appears in the content.

As additional resources, the interface tool 800 can include information such as the cast and the soundtrack list. When an operator creates a time stamp 813, the operator can create a record that contains or references information about the particular event. The information or content items can be listed for the operator to edit (see list of records 818).

The time based metadata service 120 may utilize the metadata file 111 in one or more operational environments. In particular, the service 120 may provide (i) media content that is packaged with time based metadata (as generated by the metadata generation subsystem 110); or (ii) time based metadata in connection with media that is to be played back or rendered from a media source independent of the service 120.

In one operational environment, the service 120 combines the time based data 113 and media content 121 for broadcast and/or distribution. An intermediate service or step 122 may retransmit or deliver the combined time based data 113 and media content 123 to a playback device 118. For example, a combined transmission time based metadata and media content 121 may be supplied to a cable head end, which in turn broadcasts (or retransmits) the combined time based data 113 and media content 123 to its user population. As another example, the time based data and media content 121 may be stored onto media (e.g. Blu-ray disc) and distributed through Blu-ray disc distribution channels. Other forms of media may also be used to store the combined time based data and media content 121. For example, the combination of time based data and media content 121 may be supplied as a download from a website. Still further, the playback device 118 may correspond to a set-top box, and the intermediate service or step 122 may correspond to a cable head end that delivers the combined time based metadata and media 123 to the set-top box in the appropriate format (e.g. EBIF format).

In another operational environment, the service 120 operates to supply the time based metadata 125 independent of the media content that pertains to the metadata. Accordingly, for a particular media content, the service 120 supplies a delivery node or trigger 126 with the time based metadata 125 and media content identifier. The delivery node 126 may include a broadcast or distribution mechanism 127, and an application or resource 129 to integrate or otherwise combine the metadata 125 with the underlying media content. In particular, the metadata 125 may be structured to provide time stamps 113 and information or content items 115 all along a timeline that is based on the events that occur during the playback or rendering of the associated media content. The integration resource 129 may synchronize the metadata 125 with the media content in retransmitting, or otherwise making available (e.g. download), in enhanced form, the media content 130 that includes metadata.

In this way, the delivery node or trigger 126 is able to deliver to a playback device 128, a combination of integrated content or enhanced content 130 that includes the time based metadata and the associated content.

Various mediums of playback may be encompassed by an operational mode such as described with delivery node 126. For example, the delivery node 126 may correspond to a cable head end, and the playback device 128 may correspond to (or be provided through) a set-top box. The integrated content 130 may be delivered as an EBIF formatted content.

In some variations, the distribution node 126 acquires the time based metadata for particular media content on a need to or real time basis. For example, in an implementation in which the playback device 128 is provided as or through a set-top box, one more embodiments enable the set-top box or cable head end to request the time based metadata based on user input. In such an implementation, the distribution node 126 may supply the media content identifier to the service 120, in order to receive the time based metadata 125 for the corresponding media content.

In another operational environment, the service 120 supplies the time based metadata 143 to a playback device 138 that receives the media content from another source. In particular, a media source 132 may correspond to, for example, a cable head end, or a website for downloading content, or a media that contains stored media. In the latter case, the media source 132 and media playback device 138 may be provided from the same device of the user.

The user may operate the playback device 138 to render media content 135 from the media source 132. According to some embodiments, the end user can elect to enhance the media playback with the time based metadata 143 provided through service 120. In one implementation, the user may make a request 141 for time based metadata information from the service 120. The request 141 may specify the media content the user is about to watch. As an alternative or variation, the request 141 may be generated from the media source 132, which responds to programmatic conditions and/or user input.

Upon receiving the request, the service 120 obtains synchronization timing information 131 from the media source. In an embodiment in which the media source 132 corresponds to, for example, a cable head end or website, the service 120 may query the media source 132 by specifying the media ID 133 for the media content that is to be rendered on the playback device 138. The media source in turn may provide the service 120 with the synchronization timing information 131. The synchronization timing information 131 may include information that precisely indicates when a content item is to initiate, or where (e.g. which scene or frame) in the timeline of a particular content is being rendered at the time of the query. As an alternative or variation, the service 120 may query, for example, the user's playback device 138, which can include media corresponding to the media source. For example, in some Blu-ray environments, the Blu-ray player may communicate with service 120 over network in order to receive enhanced content in the form of time based metadata 143. In some embodiments, the playback device may be a television.

In some implementations, the media source 132 may supply the timing information 131 as a one-time event for the particular media content, thus initiating a clock or counter on the service 120. Alternatively, the timing information 131 may be provided repeatedly, or on an ongoing basis. With this information, the service 120 supplies time based metadata 143 to the playback device 138 in a manner that synchronizes the timeline of the metadata 143 with that of the media content.

In another operational environment, the service 120 supplies enhanced content in the form of time based metadata and the associated media content to a user end device for playback. The user and device may correspond to, for example, a tablet or personal computer that connects to the service 120 (or its affiliates or partners) via, for example, a website or web service. In some variations, the playback device 148 may correspond to, for example, a Blu-ray player or television which receives content and metadata from over a network.

In the operational environment depicted, the user of the playback device 148 makes a media request 147 from the service 120. The media request 147 may identify an underlying media content, such as a movie or program. The service 120 supplies enhanced media 149 in that it includes both media and its associated time based metadata. The service 120 may pre-synchronize the time based metadata with the underlying media content so as to transmit the content and metadata concurrently or at one time. The playback device 148 may include programming resources that enable it to render both the media content and the information or content item included with the metadata.

As a variation, the service 120 may be configured to supply the time based metadata 157 to a paired device 160, in connection with corresponding media being rendered or played back on a user playback device 158. The user playback device 158 may correspond to a media source device, such as a Blu-ray player that plays back content from a disk, or tablet that plays back the content from the stored media file. Alternatively, the playback device 158 may receive the media 155 from the service 120. Still further, the playback device 158 may receive the media 155 from any media source, such as a cable head end or website.

In the example shown, the media playback device 158 receives the media from the service 120. Rather than communicating the time based metadata 157 to the media playback device 158, the metadata 157 may be communicated to the paired device 160. In one embodiment, the paired device 160 makes the request 161 for time based media data of an identified media content. The paired device 160 may be configured to identify itself as being a paired device, rather than a playback (or primary playback) device. Alternatively, the service 120 may be configured to identify from the request 161 that the paired device 160 is to receive the time based metadata 157 information for an identified media content, in which the media content is played back on a different device or medium. In response to the request 161 the service 120 supplies a time based metadata 157 to the paired device 160.

In an embodiment in which the service 120 provides the media 155, the service controls transmission of both the media content and the metadata. As such, the service 120 is able to synchronize the delivery of metadata information to the paired device 160, while transmitting media 155 to the playback device 158.

In an embodiment in which the media 155 is transmitted from an alternative media source, such as a cable head end or website, the service 120 may receive synchronization timing information for media content being played back, so that the delivery of the time based metadata 157 to the paired device 160 is synchronized so that the timelines of the metadata and the media content are aligned. The synchronization timing information may be received by querying the media source (e.g. cable head end), as similarly described with other embodiments. Alternatively, the media playback device 158 may provide the necessary synchronization timing information, by initiating playback of the media content upon the paired device 160 receiving the time based metadata 157.

In an embodiment in which the media 155 is stored or otherwise local to the playback device 158, the paired device 160 may be operated to request the time based metadata 161 that is associated with the media content that is to be played back on the device 158. For example, the user may operate the paired device 160 to identify the media content that is to be played back on the media playback device 158. Alternatively, the two devices 158, 160 may communicate with one another across, for example, a local communication port (e.g. Bluetooth or WiFi). Still further, the playback device 158 may be triggered to contact the service 120 in response to a playback request from a user (e.g. insertion or play command of a Blu-ray disc, play command for stored media file on a tablet etc.).

In response to receiving the request 161, service 120 may query the media playback device 158 for synchronization timing information, in response to receiving the request 161. For example, a user may be associated with an account on the service 120. Once the user accesses the service 120, the service 120 locates and communicates with both of the user devices, thus enabling identification of the paired device for receiving the time based metadata 157.

Still further, in some variations, the time based metadata 157 may be communicated to the paired device 160 from the playback device 158. For example the playback device 158 may synchronize both the time based metadata and the media content by receiving respective transmissions of one or both from an external source (e.g. content source or service 120), and then retransmitting the metadata to the paired device 160. The transmission of the metadata 157 to the paired device 160 can be done through a communication medium such as, for example, Bluetooth or other short radiofrequency wave communication channels.

Figure 1B:
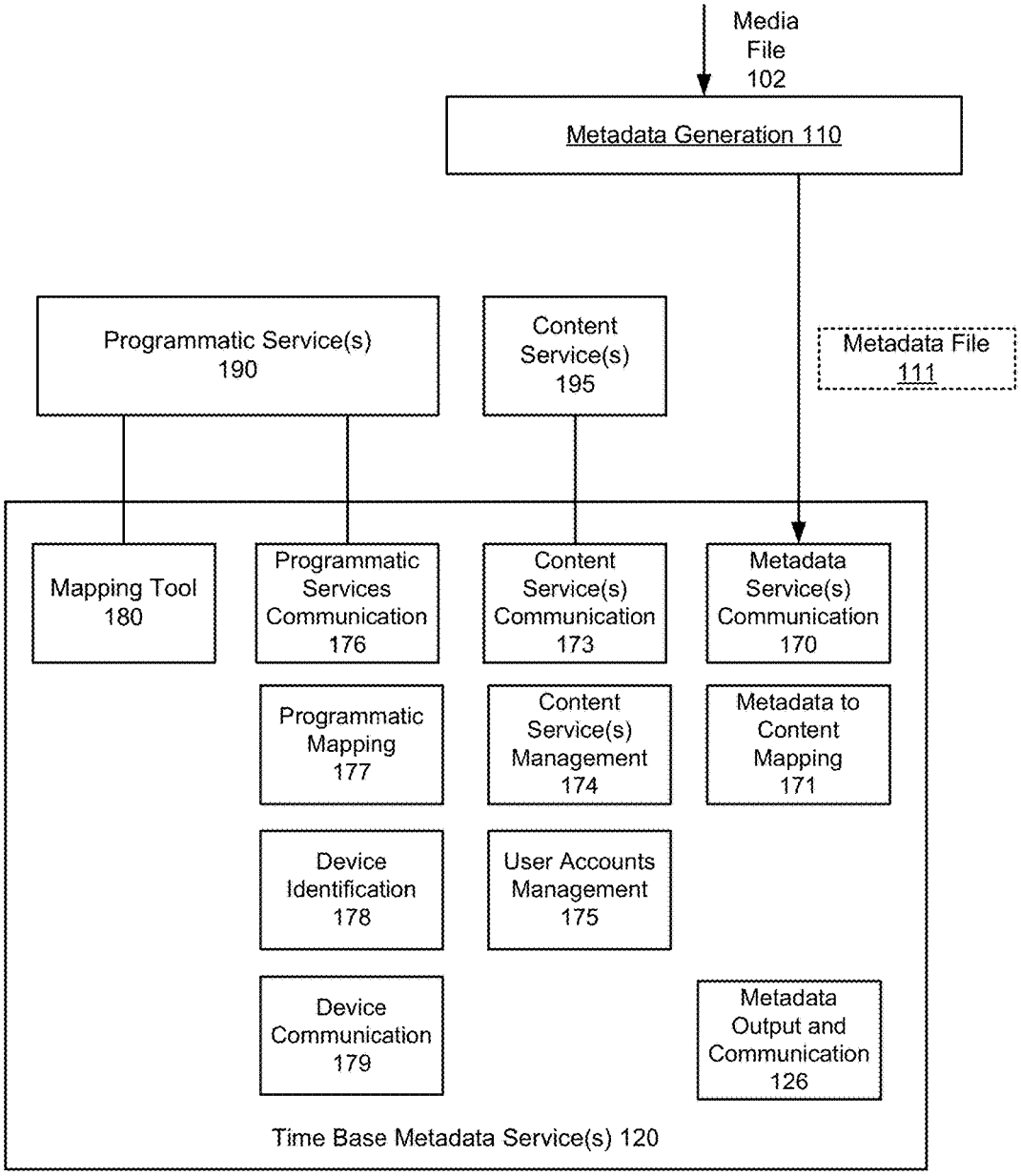

FIG. 1B is a block diagram illustrating the architecture of the time based metadata service(s) 120 according to some embodiments described with FIG. 1A. More specifically, According to some embodiments, the services described in connection with the use of the time based metadata service (s) 120 may include one or more components, modules or services shown in FIG. 1B depending on the operating environment of the implementation.

With regard to embodiments described, time based metadata service(s) 120 may also be configured to map multiple media playback devices to each other thereby enabling the devices to share metadata and/or associated content, even if one or more of the playback devices are not capable of communicating directly with each other.

As described with FIG. 1A, in certain embodiments, the metadata generation subsystem 110 processes media files 102 corresponding to movies and/or programs. The output of the metadata generation subsystem 110 includes a metadata file 111 having a combination of time stamps 113 and associated information 115 or content (FIG. 1A).

In another embodiment such as illustrated in FIG. 1B, the metadata file 111 may be sent from metadata generation subsystem 110 while the associated information 115 or content may be provided from a second source, such as, for example, content service(s) 195. The time base metadata service 120 can include a content service communication interface 173 to receive content (e.g. movies or programs) from different sources, either in real-time or asynchronously with re-transmission of such content in enhanced form. As examples, the content service communication interface 173 includes a program interface to receive content as file uploads from content providers. In other variations, content interface 173 receives content in form of streaming or via broadcast medium (e.g. cable, satellite) or data communications only (e.g. questions for a quiz, consumer user's commentary and web posts, lists of friends related to the content).

In some embodiments, time metadata service(s) 120 is configured to associate or map the content (e.g. as received from content service(s) 195) to the metadata file 111 and provide the newly associated content to one or more playback devices. For example, the metadata file 111 may be received via a metadata services(s) communication 170 of the time metadata service(s) 120 and provided to a metadata content mapping component 171. The mapping component 171 then associates or maps the metadata 111 with content (e.g., movie or programming content) received from the content service(s) 195 via content service(s) communication 173. In some embodiments, the metadata 111 includes time stamps that correlate to scenes, frames and/or events in the content. The metadata to content mapping 171 programmatically links the time stamps and the associated metadata to the run time of the corresponding content. For example, one file, or two linked files may be created that can be played simultaneously by a playback device in order to render the content (e.g. movie) and time based metadata at appropriate times (e.g. frame indicated by the time stamp).

The service 120 communicates the mapped metadata/content to a playback device using, for example, a delivery node 126 such as described above with respect to FIG. 1A. Other delivery nodes such as described with FIG. 1A may alternatively be used.

The service 120 may also include a user accounts management service 175. The service 120 may associate individual users with accounts, which can incorporate pay for service functionality or other capabilities requiring the activation of an account. For example, functionality provided via the service 120 can be provided via a pay per view or monthly subscription basis. As an addition or alternative, account information can carry device and user profile information of a particular user. Such information may include (i) contact information about the user; (ii) one or more identifiers as to a type or types of playback device(s) the user is utilizing; (iii) historical data indicating the interactions of the user with a particular media file; (iv) linked accounts for other web services which the user may have registered to; and/or (v) preferences of the user regarding the output and display of the supplemental content.

According to some embodiments, service 120 provides programmatic enhancements to enable third-parties (e.g. advertisers) to identify appropriate topics and information to supply with content. The service 120 includes a programmatic service communication (PSC) 176 that provides an interface for third-parties (e.g. advertisers, content owners, movie studios or sponsors) to research content and time based metadata from a library or collection of media files (e.g. movie library of studio). The PSC 176 can be used by the third-party (e.g. via service 190) in order to specify additional metadata content, such as, for example, promotional metadata content. For example, the advertiser may use the PSC 176 to specify overlay ads or content that relate to a particular commercial product, or, conversely, a particular commercial product approved for display with a particular media asset. The advertiser may also specify the media content, or supply information to have the media content selected programmatically. The programmatic mapping component 177 can use information provided from the advertiser to perform one or more of the following: (i) select the media content on which the advertiser content is to be displayed, (ii) select the scene(s) or events of the media content, and/or (iii) identify the particular time stamp within the media content that is to serve as the stamp for the supplied content.

As an addition or alternative, the programmatic mapping 177 may include logic (algorithms) to scan media content, its associated metadata and/or time base metadata in order to identify one or more semantic categories corresponding to the media being viewed by the user. This information may be communicated to the programmatic service(s) 190. The service can enable manual or programmatic selection of supplemental metadata content, in connection with time based metadata.

For example, if the user is watching a program or movie about dogs and/or one or more of the time stamps is identified as corresponding to dogs, mapping 177 can communicate the information to the programmatic service(s) 190. The service 190 may then determine which supplemental content (e.g., advertisements regarding dog food, dog breeders, etc.) can be added to the media and provided to the user.

In certain embodiments, service 120 may also include a device identification service 178 configured to identify a type of playback device utilized by a user. For example, the device identification service 178 may determine that a user has access to, or is using, a particular device such as, for example, tablet computer, Blu-ray player, set-top box, etc., as well as the communication format for each device (such as determined by device communications 179). In one or more embodiments, once the device information has been determined, the information may be associated with a user and stored using the user accounts management 175. Device identification may also trigger the service 120 to operate in one of multiple possible computing environments, as described with prior embodiments.

Service 120 may also include mapping tool 180 configured for associating content received from programmatic mapping service(s) 190 to metadata 111. An exemplary mapping tool 180 is shown in FIG. 9A.

Figure 9A:
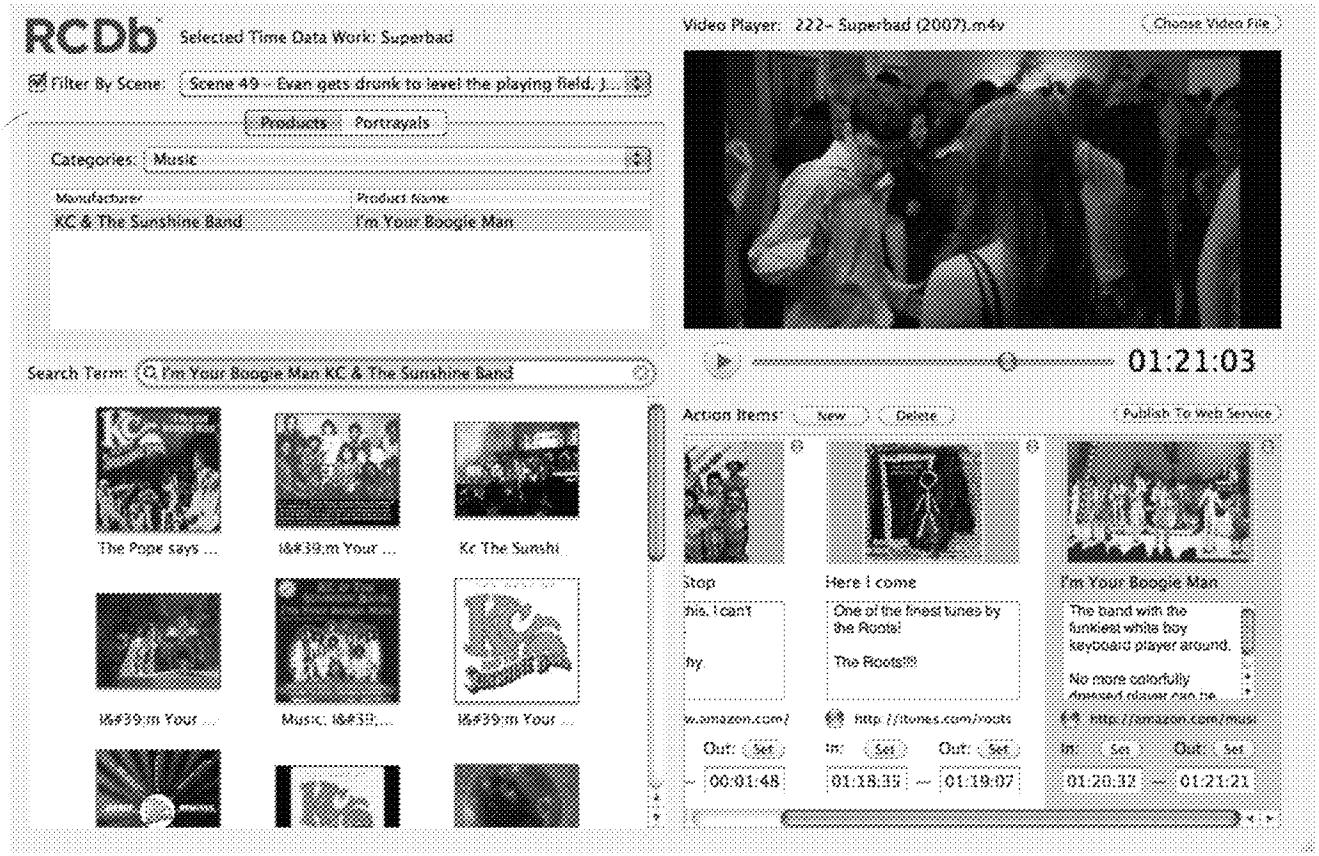

Referring to FIG. 9A, mapping tool 900 includes a selector interface 910 to enable a manual operator to filter the time stamps and/or metadata based on scenes. The manual operator may utilize the interface through, for example, the service 190. For example, the interface 910 may be generated or provided with the mapping tool 180. In using the interface 910, the operator can view the context of numerous scenes in a media content, view the time based metadata and its information, generate new time based metadata, verify the additional information and/or select other information, if any, that could be added. For example, if a particular song by an artist is playing in the given scene, additional content or advertisements corresponding to additional songs performed by that artist may be selected by the operator to later be provided to the user at the time of content playback. In another embodiment, songs and/or artists from a particular genre of the identified song and/or artist may be associated by the operator with the metadata which can be later presented to the user. The mapping tool 900 may be used on any number of categories such as, for example, clothing, food, scene or shooting locations, scene mood, atmosphere or ambiance, objects present in screen, etc. As an additional example, the mapping tool may identify presence of commercial objects, or objects that are identifiable to a theme or topic (e.g. advertisement theme), or other factors, including user specified or user generated ("crowd-sourced") factors.

Referring back to FIG. 1B, service 120 may be configured to map one playback device to another playback device without each of the playback devices having capabilities of communicating directly with each other. Thus, a first playback device may deliver relevant information 115 through service 120 to a second playback device or paired device. In certain embodiments, device communications 179 determines a communication protocol of one device and may convert the relevant information 115 from a first communication protocol utilized by the first playback device, to a second communication protocol, utilized by the second playback device.

In one embodiment, the imported metadata and related time stamps may be imported in a first format (e.g., the format in which they were created) and transferred to a playback as is. In another embodiment, the time stamps and metadata are programmatically processed to match the structure of the metadata file 111 and/or the playback device to which the information will be sent.

Figure 1C:
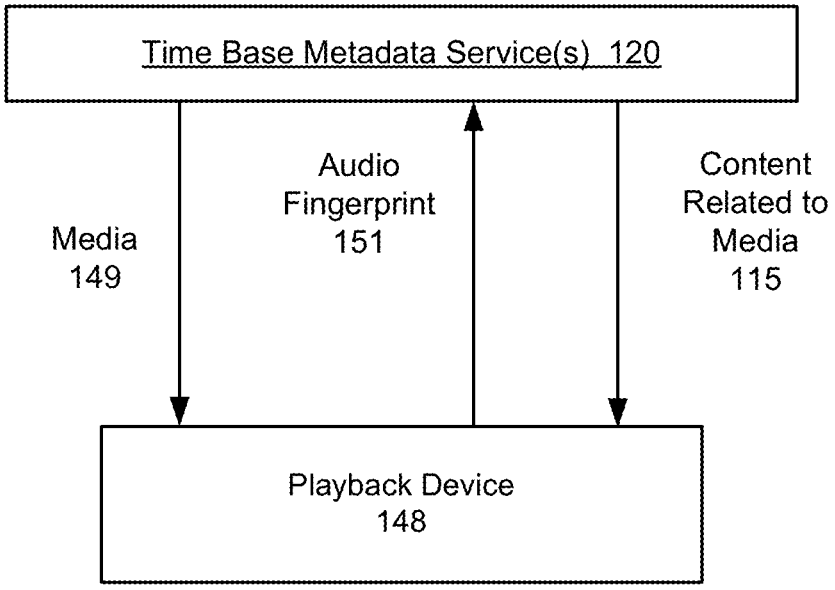
Figure 1D:
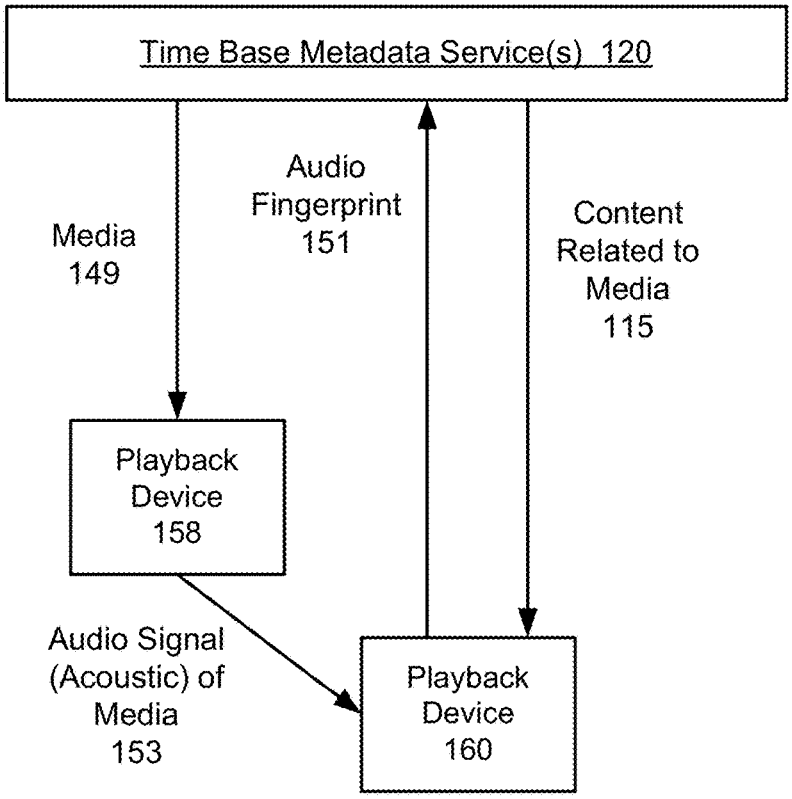

FIG. 1C-FIG. 1D illustrate variations or additions to embodiments described in FIG. 1A and/or FIG. 1B. FIG. 1C illustrates an architecture in which the service 120 provides the media 149 to a playback device (e.g., playback device 148). The playback device 158 communicates an audio fingerprint 151 to the service 120. The audio fingerprint can be used to determine information about the media content, such as which media content is being played back, or alternatively, which scene is being played back. The audio fingerprint 151 can be communicated to the service and used to identify the media content, or the particular portion or scene of the media content. For example, the media ID 133 can be determined from the audio fingerprint 151. This information is provided to the service 120 which, under some embodiments, can map or associate the relevant time stamps 113 to the identified media ID 133 and provides the Information 115 back to the playback device 148.

In another embodiment illustrated by FIG. 1D, an audio signal 153 associated with the media 149 may be played on a first device (e.g., playback device 158) and listened to on a paired device (e.g., paired device 160) after which the paired device 160 provides the audio fingerprint 151 to the service 120. As discussed above, the audio fingerprint 151 is identified and mapped to a media ID 133 and the information is provided to the service 120. Service 120 then maps or associates the relevant time stamps 113 to the identified media ID 133 and provides the information 115 back to the paired device 160. In another embodiment, the relationship between the paired device 160 and playback device 158 may be reversed such that the paired device 160 transmits the audio signal to the playback device 158, which in turn, transmits the audio fingerprint to the service 120. In the various implementations shown, the paired device may be used to receive metadata, either from the service or from the playback device 158, 160. The paired device can alternatively display portions of the content.

Methodology

FIG. 2 through FIG. 5 illustrate various embodiments for providing time based metadata in connection with the rendering of a media content. Methods, such as described by FIG. 2 through FIG. 5, may be implemented using components such as described with a system of FIG. 1. Accordingly, reference to elements of system 100 is intended to illustrate suitable components or subsystems for performing a step or sub step being described.

Figure 2:
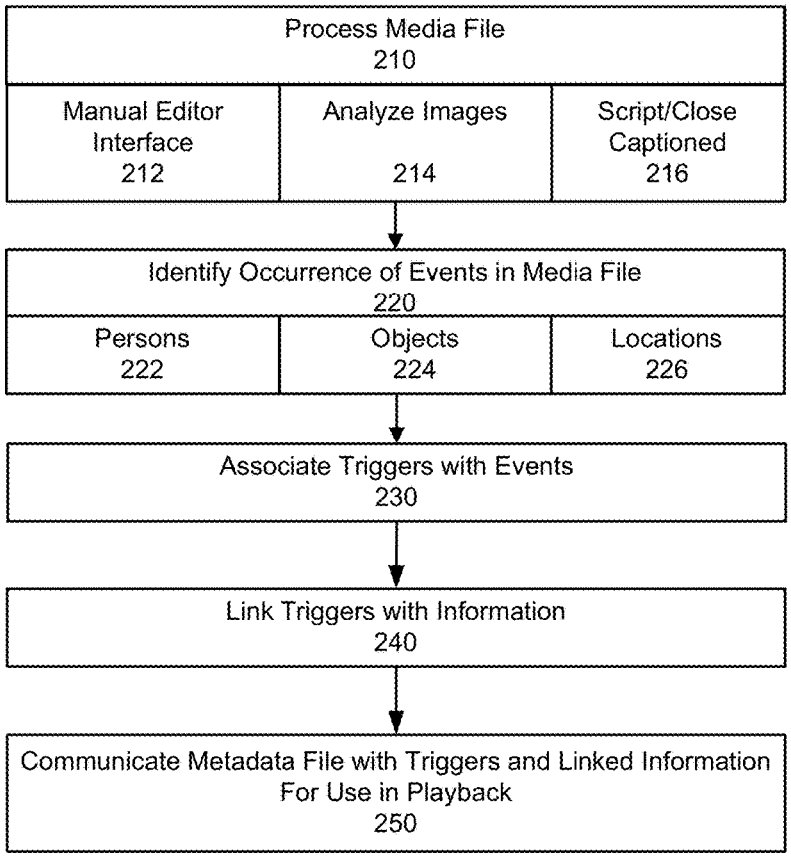
FIG. 2 illustrates a method for generating time based metadata for a media content, according to embodiments.

FIG. 2 illustrates a method for generating time based metadata for a media content, according to embodiments. The media content may correspond to, for example, a movie, a television program, a short film, an animation, a home-made video, or other audio/video work or creation. The media content may be processed or analyzed (210) using programmatic resources that facilitate manual operation and/or automation. Accordingly, embodiments may include a metadata generation sub-system 110 that includes a manual editor interface (e.g. See FIG. 8), and one or more programmatic resources that enable automated processing. The automated resources can include, for example, image analysis (214) which uses image recognition to identify persons and objects appearing in the content. As an addition or alternative, the automated process can include steps for analyzing script and/or closed-captioned analysis (216), which uses text content associated with the content in order to facilitate programmatic detection of events (e.g. the presence of a person in a scene, the use of a location, etc.).

The media content is processed in order to identify the occurrence of events for which supplemental information or content can be provided (220). Various kinds of events may be detected in the media content. These include, for example, events pertaining to (i) an actor or character (222), (ii) the use of objects (224), such as commercial objects, (iii) the playing of songs or supplemental media (e.g. television show in background) as part of the media content, and/or (iv) depiction of locations (226) (e.g. landmarks, geographic regions etc.).

The events of the media content may be individually associated with time stamps that are included as part of an associated metadata file (230). The metadata file is structured to reflect a timeline of the media content. The occurrence of an event in the media content may be signified by a trigger, which is marked in the metadata file to coincide with the occurrence of the event at the playtime of the media content. In this way, individual triggers are associated with corresponding events of the media content.

Once events are identified, the events may be linked to pertinent information or content (240). For example, time stamps that signify the presence of an actor or character in a scene of the media content may be linked to a data item that includes additional information about the actor, the character or the scene. Each time stamp can be linked to a data file that contains additional information pertaining to the event signified by the time stamp. The data file may be created programmatically and/or manually. For example, if an actor is signified by a time stamp, programmatic resources may automatically identify a profile of the actor from a movie database and include information (or a link) to the movie profile as part of the data item that is associated with the time stamp. As an alternative or addition, an operator may manually edit or create content for the data item that is associated with the trigger.

In some implementations, metadata generation subsystem 110 processes a media content in order to detect events that occur as part of the media content. The metadata generation sub-system 110 associates the detected events with time stamps, which are in turn associated with timing information that signifies when the events occur during the playback of the media content. Additionally, the detected events can be associated with information or content items that supplement the content during portions that coincide with the placement of a corresponding time stamps (signifying when the event is taking place as part of the content). In one implementation, the metadata generation sub-system 110 includes a manual editor interface (e.g. see FIG. 8) that includes programmatic enhancements for facilitating an operator in (i) inserting time stamps along an appropriate timeline of the corresponding media content, (ii) associating time stamps with data items (e.g. information/content), or programmatic services 190 or content services 195 that pertain to (e.g. describe or supplement) the event identified by each of the time stamps.

As an alternative or addition, the process of event detection and subsequent data item association may be performed programmatically and with automation. In one implementation, individual frames that comprise the video portion of the media content are analyzed using image analysis. For example, individual frames are analyzed to detect faces, and to associate the faces with identities of persons (e.g. actors) from a database. Likewise, frames of the media content may be analyzed to detect objects (e.g. commercial objects) and to recognize the objects by type of brand using image analysis. The objects can then be mapped to programmatic services 190 or content services 195.

Figure 9B:
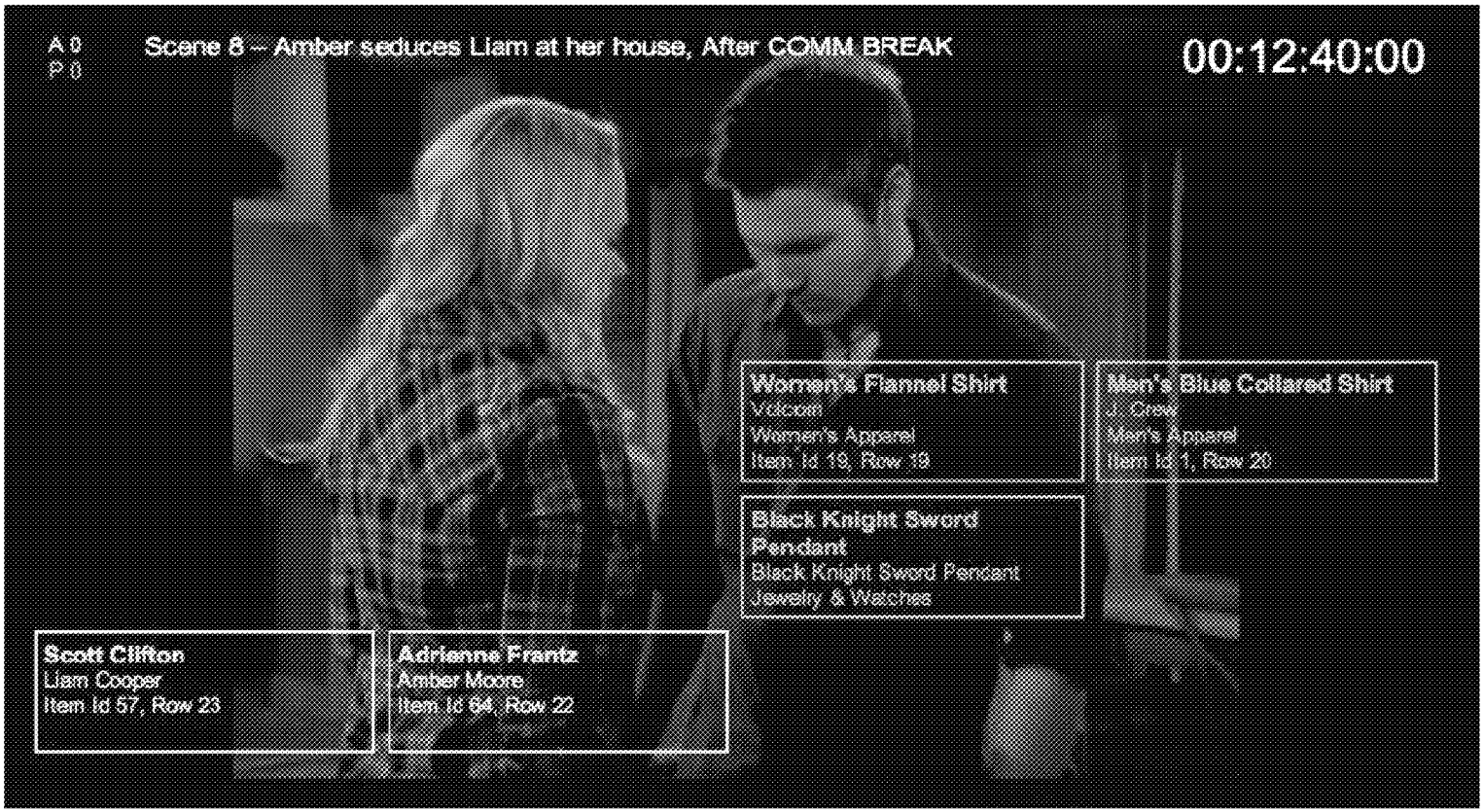

Once the metadata file is created with time stamps and linked information, the metadata file is made available to manual operators. In certain embodiments, the manual operators may utilize tools shown and described with respect to FIG. 9A through FIG. 9C to check the accuracy of the time stamps, and the associations of those time stamps with relevant information 115 and programmatic services 190 or content services 195. As an addition or alternative, such tools may be used by third-party metadata providers.

The time stamps and metadata are then communicated to playback devices and/or media sources for use with playback of the associated media file (250). Depending on the implementation, the contents of the metadata file can be transmitted in real-time, to coincide with playback of the associated media content on a playback device. Alternatively, the contents of the metadata file can be transmitted and stored in a playback environment, for use when the associated media content is played back from a particular source or on a paired device 160 at a later time. For example, in a cable/set-top box environment, the metadata file and/or its contents can be transmitted to a media source (e.g. cable head-end, website) where it is re-transmitted to a user playback device (e.g. set-top box).

Alternatively, the metadata may be transmitted to the media source (e.g. cable broadcast, website). The receiving media source may combine a media content transmission with the metadata, so as to transmit the media content and the metadata to the user for playback. According to some embodiments, the media source may include programmatic resources for (i) requesting the metadata that is to accompany the media content transmission, and (ii) combining transmission of the metadata with the media content, including synchronizing the delivery of metadata with the transmission of the media content along a timeline that is reflected by the media content.

Still further, the contents of the metadata file can be communicated to the playback device while the playback device receives the media content from another media source (e.g. cable/set top box, website). For example, the playback device may receive the metadata from time metadata service 120, while receiving the coinciding media content from a media source (e.g. cable head end). The service 120 may synchronize the transmission of the metadata using reference timing information for the playback of the media content (e.g. start time). Alternatively, the playback device may synchronize the receipt of metadata from one source with the receipt of media content from another source in creating an enhanced playback containing both the media content and the time based metadata.

In some variations, the contents of the metadata file may be transmitted and stored by, for example, a user of a playback device. The stored file can be accessed and used when the playback device renders the associated media content or file.

As another variation or alternative, the metadata file, or its contents, may be transmitted to a paired device of a user, for use in conjunction with rendering of the associated media content on a playback device. For example, the metadata file may be transmitted over a network to a tablet device that the user can hold and view, while watching the associated media content on a set-top box or Blu-ray environment.

Figure 3:
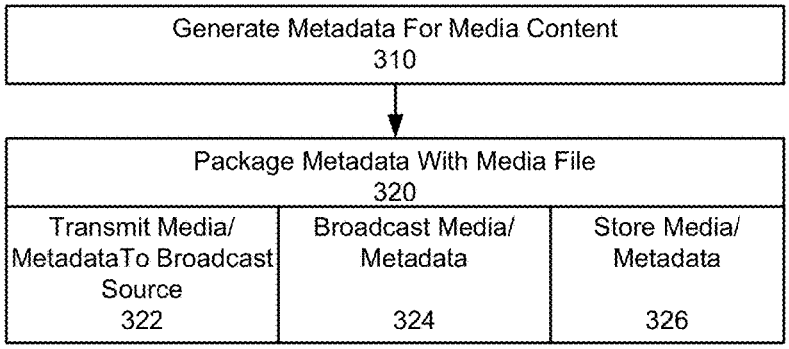
FIG. 3 illustrates a method for providing media data that is packaged or integrated with time based metadata, according to an embodiment.
Figure 4:
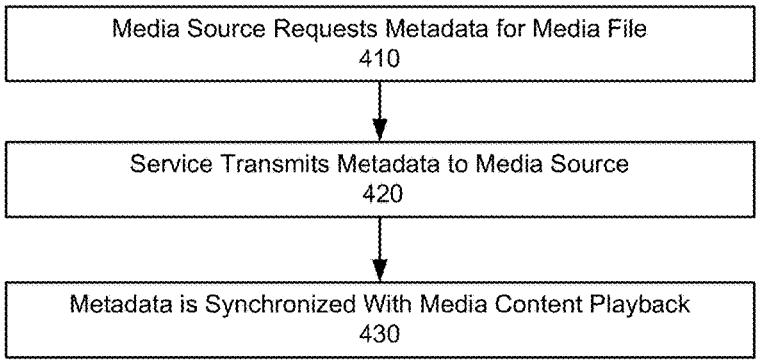
FIG. 4 illustrates a method for providing time based metadata to a media source, for transmission to a media playback device with media content, under an embodiment.
Figure 5:
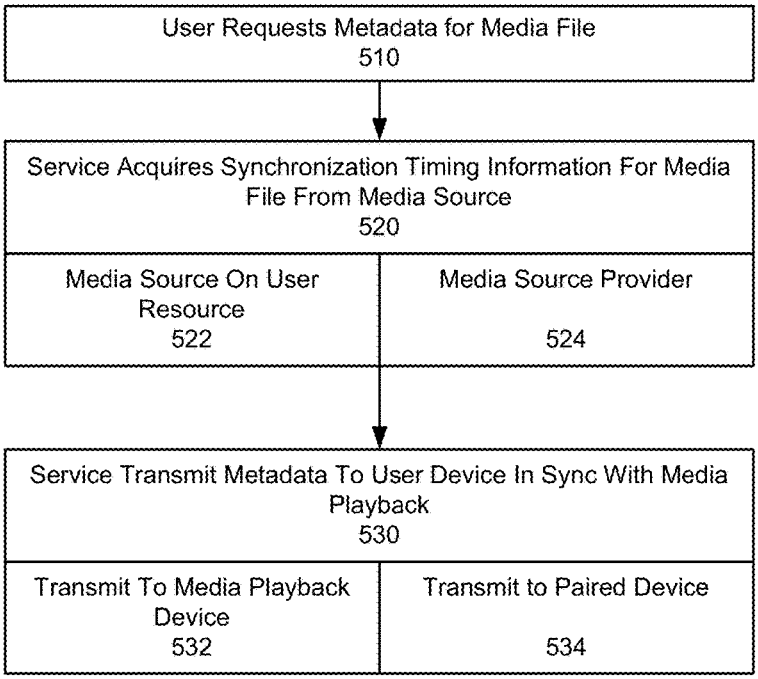
FIG. 5 illustrates a method for providing time based metadata to a playback device that receives the media content from a media source, according to another embodiment.

Numerous variations to how the generated metadata is communicated and used are described with, for example, embodiments of FIG. 3 through FIG. 5.

FIG. 3 illustrates a method for providing media content that is packaged or integrated with time based metadata, according to an embodiment. As described with an embodiment of FIG. 2, a metadata file is generated for a particular media content (310). The metadata file may be structured to include timing information that identifies the occurrence of events in the runtime of the corresponding media content. The metadata file may be provided as a separate file from the media content, but the packaging of the metadata with the media content can inherently include programmatic resources that can trigger the metadata file and the media content to synchronously initiate their respective playback, so that the timeline for each of the metadata and the media content are aligned during the playback of the media content.

In an embodiment of FIG. 3, the metadata is packed with the media file and then delivered (320). In one implementation, the combined media and metadata are transmitted to a media source, such as a broadcast source (e.g. cable head end in distribution) or website, where the data is retransmitted to a playback device of the user (322). In another implementation, the combined media and metadata are transmitted to the media playback device of a user without an intervening distribution of broadcast source (324). For example, service 120 may be provided through a website that can deliver the combined media and metadata package to an end user operating a computing device, such as a laptop, personal computer, game station, or Internet television. As another variation, the combined metadata and media may be provided on a storage medium, such as on a Blu-ray disc, or flash memory device (e.g. accessory device, tablet) (326).

FIG. 4 illustrates a method for providing time based metadata to a media source, for transmission to a media playback device with media content, under an embodiment. A method such as described with FIG. 4 may be implemented to enable a media source to deliver or otherwise provide media content in an enhanced form (as provided by time based metadata). In response to a media playback request to a user, a media source (e.g. broadcaster) may request metadata for the requested media content (410). In an alternative implementation, the request may be initiated by the media playback device of the user, which may use a network connection to communicate with the service 120 separately from the media source. The service 120 may respond to the request by delivering metadata associated with the media content identified in the request to the media source (420). The media source may be provided with programmatic resources to synchronize the timing of the metadata with the playback of the media content (430). For example, the media source may include an application that synchronizes the metadata with the playback of the media content, so as to transmit both metadata and media content in synchronous fashion to the media playback device.

In some variations, the media playback device may request and receive the metadata independently from the media source. For example, the media playback device may request the metadata from the service 120. The service 120 may acquire the synchronization timing information from the media source, and deliver metadata in real-time to the playback device. Alternatively, the playback device may receive the metadata in real-time or synchronously, and include programmatic resources for synchronizing the playback of the metadata with the associated media content. Numerous such variations are possible.

FIG. 5 illustrates a method for providing time based metadata to a playback device that receives the media content from a media source, according to another embodiment. In one implementation, a user requests metadata for a media content that the user is to playback (510). The media content may, for example, reside on the user's device, or be provided from a separate media source (e.g. cable or website).

The service 120 may respond to the request in real-time, so as to transmit metadata concurrently and in-sync with playback of the media content on the playback device. In responding to the request, service 120 may acquire synchronization timing information in order to transmit the media content in sync (520). The synchronization timing information may correspond to, for example, the exact time that the media content was initiated, or the precise frame or portion of the media content that is rendered at a reference time. In one implementation, the service 120 acquires the synchronization timing information from the media source (522). In another implementation, the service 120 acquires the synchronization timing information from the media playback device (524).

In some variations, the media source may reside on a user device. For example, the media source may correspond to a Blu-ray player. The synchronization timing information may be communicated from the Blu-ray player of the user.

The service 120 may then transmit the metadata information in real-time to the device of the user (530). In one embodiment, the metadata is transmitted to the media playback device of the user (532). In a variation, the metadata is transmitted to a paired device of the user (534). The paired device may correspond to, for example, a tablet, smart phone or laptop, while the media playback device may correspond to a set-top box and television, personal computer, Blu-ray player or Internet television. As an example, the service 120 may maintain an account for the user from which it maintains information to identify and locate the media playback device and the paired device on a network. In another embodiment, the service 120 can broker a request. For example, service 120 may provide response actions to a user interacting with the media, either through the playback device or paired device and connect the user to programmatic services 190 or content services 195.

FIG. 6A through FIG. 6F illustrate examples of media content presentation that includes metadata content, according to some embodiments described herein. The enhanced presentation of media content may be implemented using, for example, a system such as described with an embodiment of FIG. 1. Accordingly, reference is made to elements of FIG. 1 for purpose of illustrating suitable components or elements for creating metadata presentations as shown.

Figure 6A:
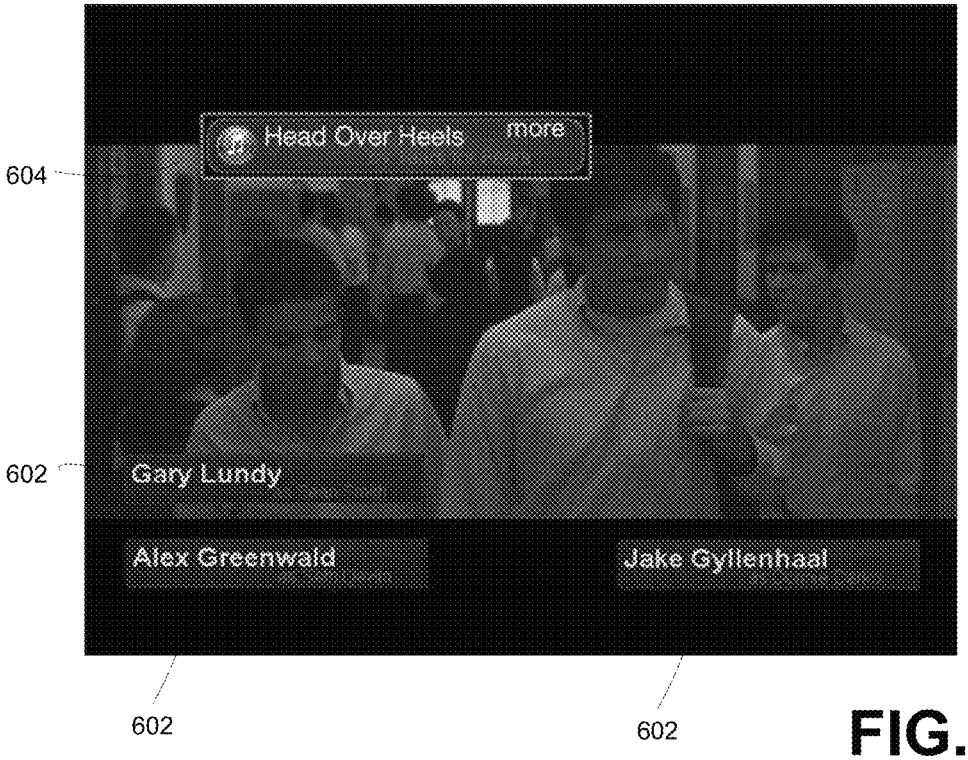
FIG. 6A through FIG. 6F illustrate examples of media content presentation that includes metadata content, according to some embodiments described herein.

FIG. 6A illustrates a media content presentation that is enhanced with presentation of time based metadata, in accordance with one or more embodiments. In an embodiment described, the media content is a movie, and the metadata that is presented with the movie includes actor names for characters that appear in individual scenes. In the example provided, a given scene is marked by the presence of three actors. Each are identified by metadata items 602. The metadata items 602 may also include additional information, such as the name of the character that the actor is playing in the given content item. Additionally, a song or track that starts playing in a scene may include an informational tag 604. With reference to prior embodiments, the metadata file may be provided in form of a file that includes time based triggers that coincide with the timeline of the movie. At scenes (e.g. frames) that coincide with introduction or presence of an event (e.g. an actor, a song playing), the informational tag is presented as an overlay.

Figure 6B:
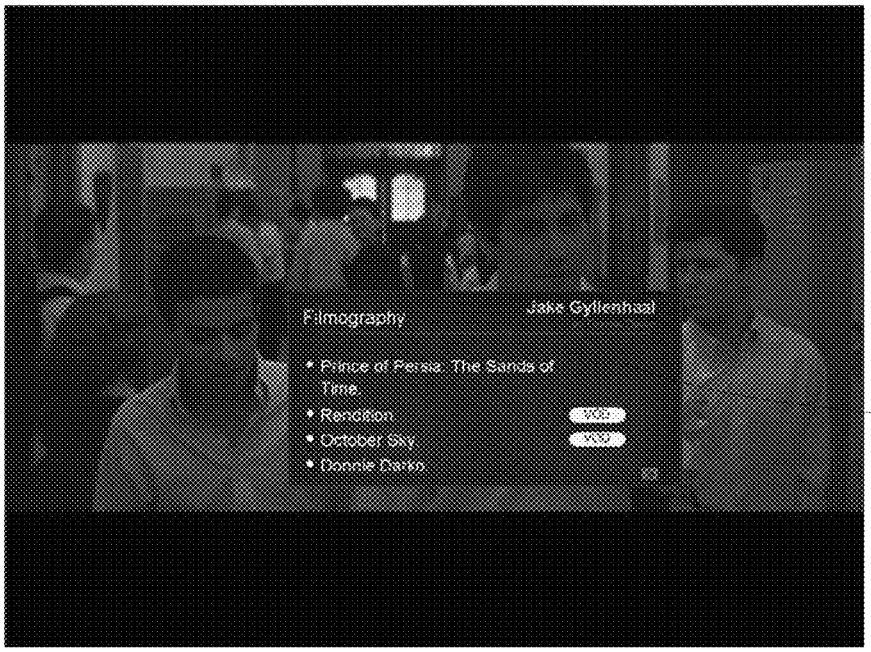

FIG. 6B illustrates the information tag being interactive or able to include supplemental information, such as the filmography 606 of an individual actor. In some implementations, the user is able to interact with the information tags that appear over the media content. The user interaction may, for example, be the user operating the playback or paired device requesting additional or supplemental metadata from the metadata source (which may be the media source or the service 120). In another embodiment, the user interaction may be a request to receive (e.g., video on demand, purchase a digital copy, or Blu-ray copy etc.) and/or view additional media content the selected actor(s) is in.

Figure 6C:
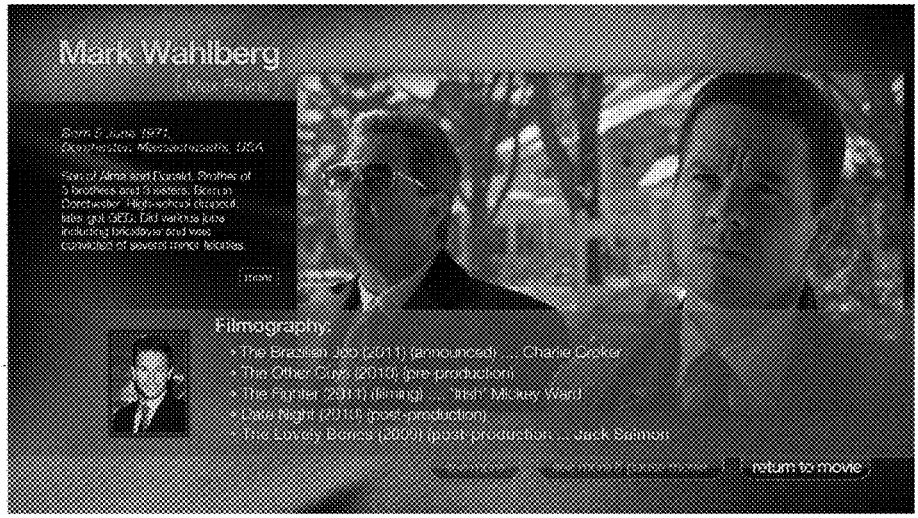

FIG. 6C illustrates additional examples of metadata content that can be overlaid with the media content. In FIG. 6C, the metadata content 612 can occupy a majority of the screen space, so as to present additional information about the actor (or event that is being described).

Figure 6D:
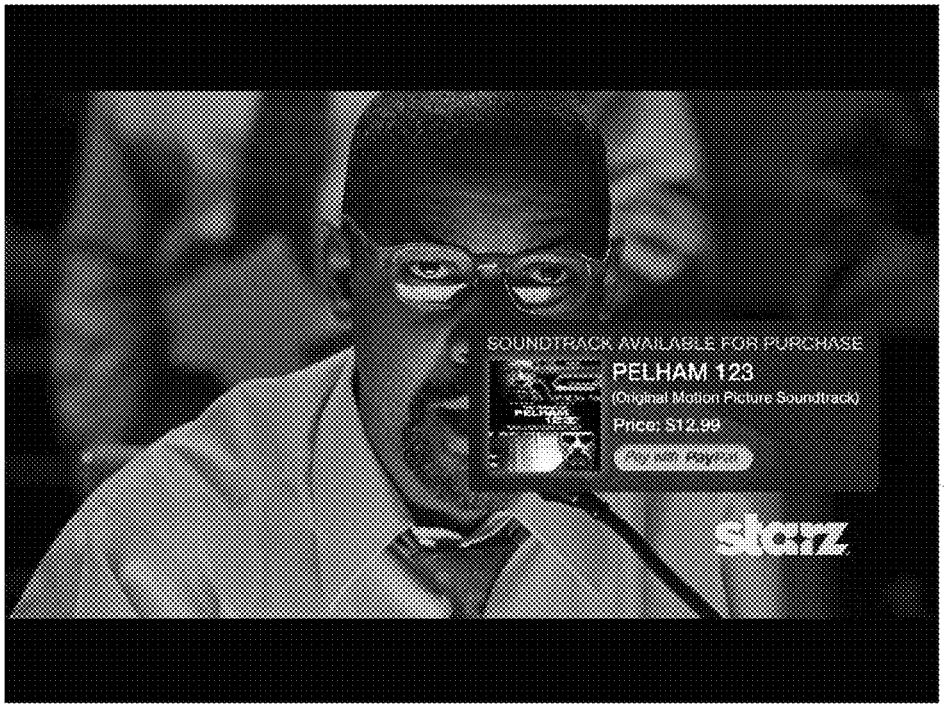

FIG. 6D illustrates an example in which metadata includes supplemental information or services, such as an interactive feature that enables the user to purchase a product associated with an event of media content (or the media content itself). In the example shown, the user is able to purchase a soundtrack by interacting with metadata content 622. The metadata content 622 can be displayed to the user at, for example, the occurrence of a relevant event, such as the playback of a song that appears on the soundtrack.

Figure 6E:
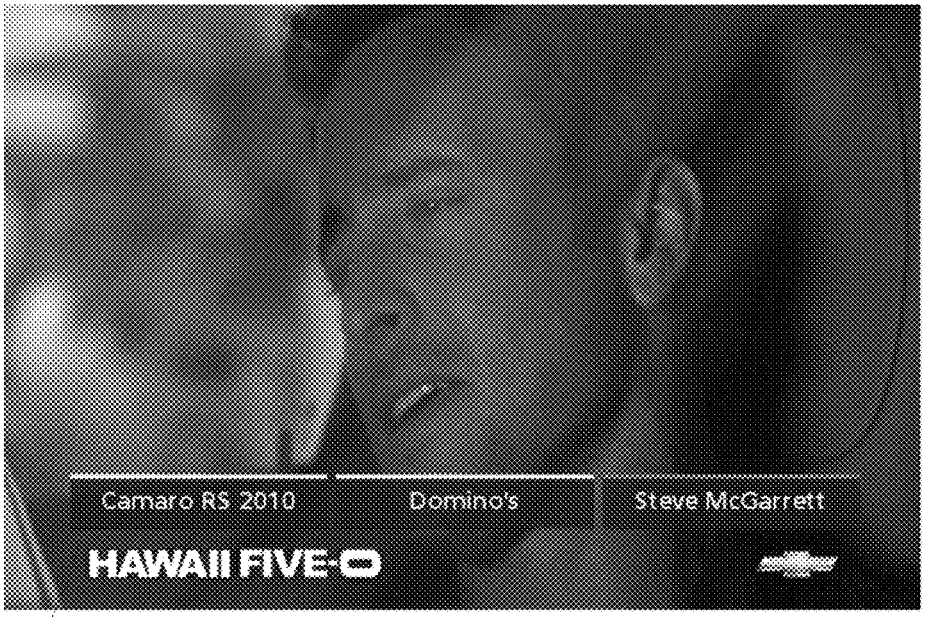
Figure 6F:
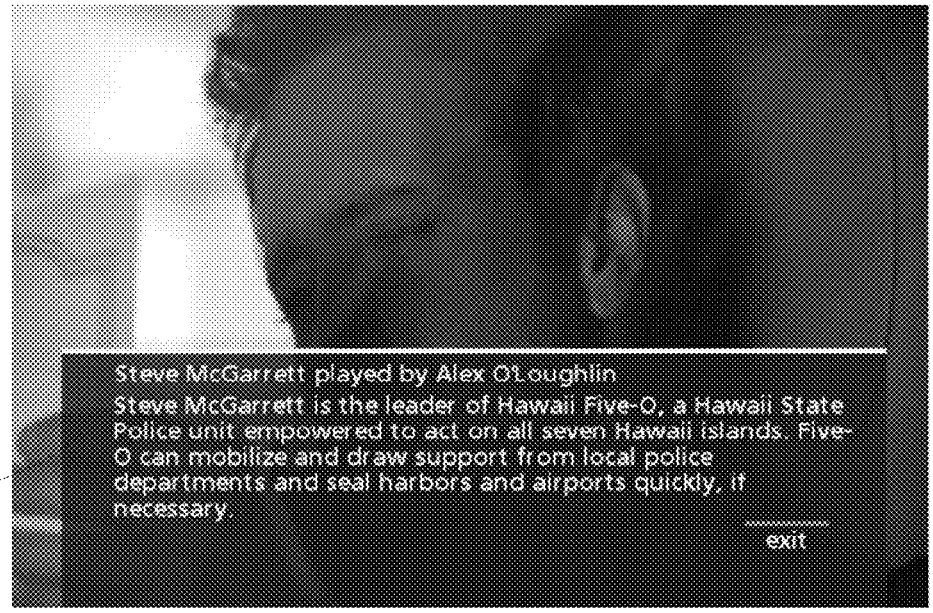

FIG. 6E and FIG. 6F illustrate the user of metadata content that coincide with product placement within a media content. In the example shown, the product placement event coincides with an actor of a television show riding in a sports car. The metadata content 624 identifies, for example, the make and model of the car. Additional information, such as information about the character 626 or program, may also be displayed as an overlay of the content.

Figure 7A:
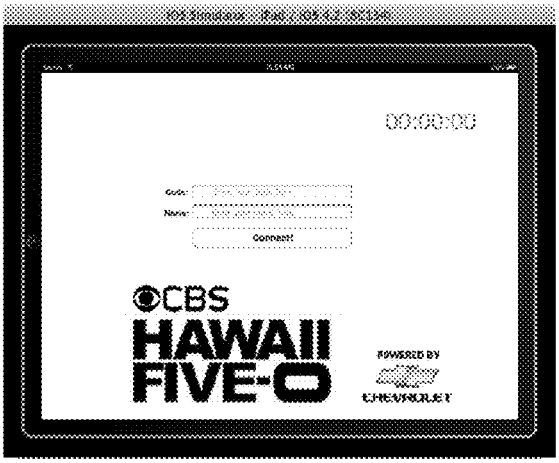
FIG. 7A through FIG. 7F illustrate examples of media content presentations that include metadata content for playback and/or paired devices, according to some embodiments described herein.
Figure 7B:
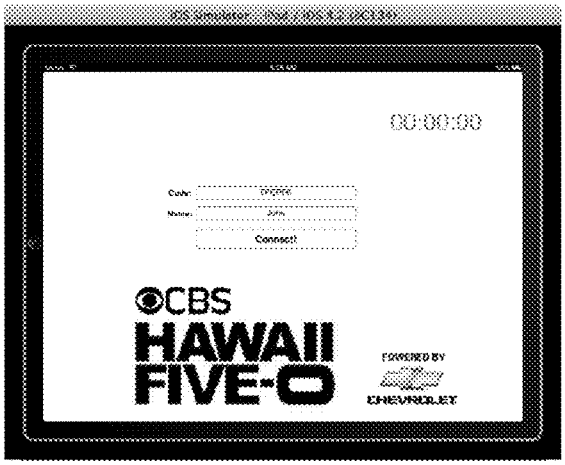
Figure 7C:
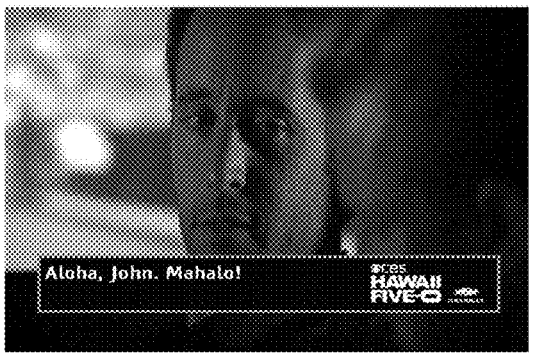

FIG. 7A through FIG. 7F illustrate examples of media content presentations that include metadata content for playback and/or paired devices, according to some embodiments described herein. In FIG. 7A and FIG. 7B, a user is able to login to a service that is provided in connection with the playback of the media content. For example, the user may include an account with service 120, and have the ability to login in order to receive metadata in connection with media content that is either received from the service, from a different media source (e.g. cable or website), or played back from a local source (e.g. Blu-ray player). FIG. 7C illustrates an implementation in which the metadata presentation over the media content is personalized. In variations, the metadata content presentation may also be configured or tailored for the particular user based on, for example, preferences of the user. For example, as shown in FIG. 7C, the user preference may be to have all spoken dialogue displayed in real time.

Figure 7D:
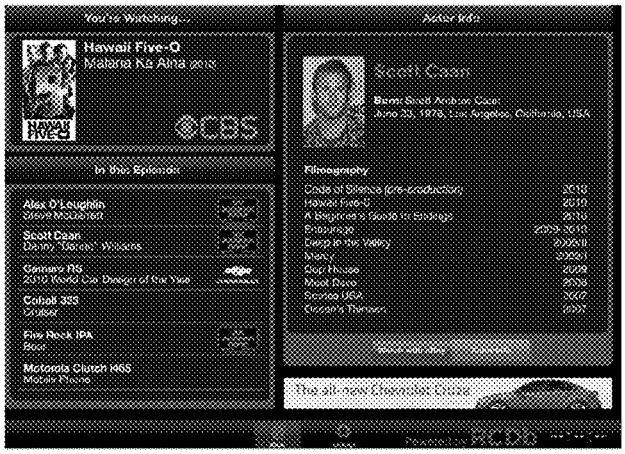
Figure 7E:
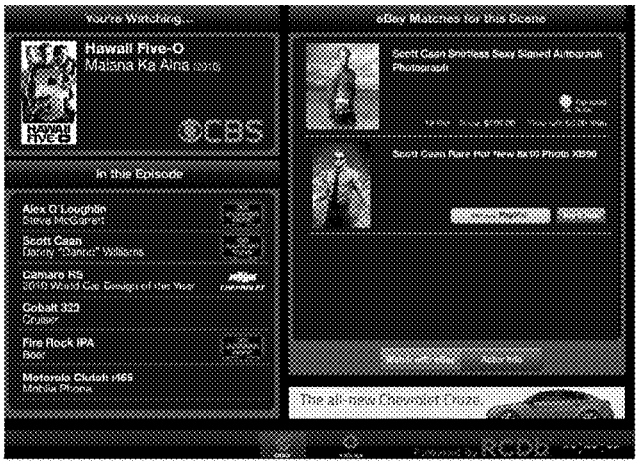
Figure 7F:
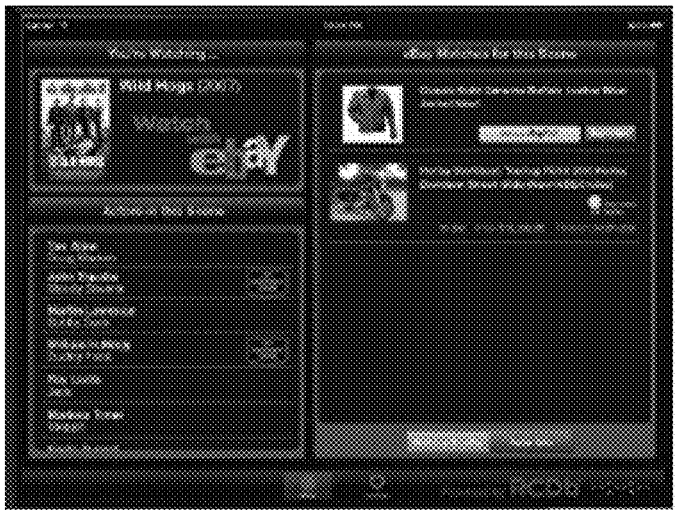

FIG. 7D through FIG. 7F illustrate presentations that supplement the media content independently of the media content presentations. Such supplemental presentations may be displayed on a playback device in lieu of, for example, the media content (e.g. the media content may be paused), or displayed on a paired device (e.g. tablet) while the user watches the media content on a media playback device (television). Accordingly, some implementations provide for the supplemental metadata content to be provided independent of the occurrence of events or triggers. For example, the supplemental content showing the website content may be accessible to the user throughout the playback of the media content.

In FIG. 7D and FIG. 7E, the presentations include, for example, website content which can display various forms of content about individual characters of a program. In FIG. 7F, the supplemental content includes online auction or e-commerce content from programmatic services 190 or content services 195. Various alternatives to the form of supplemental content that can be displayed are possible.

Metadata Placement and Development

Various parties may utilize an interface or tool to develop metadata themes of content for inclusion with a media content. For example, an operator of the metadata generation sub-system 110 may place metadata according to a default criteria (e.g. identify all actors, songs, bibliography etc.). Other operators, such as users of the service 190 may place metadata by themes. For example, the operators may be provided an interface (e.g. See FIG. 9A and FIG. 9C) where metadata is identified, and commercial or user-selected themes can be specified for scene(s). The operator can view the content, the product placement, see tags associated with placed content etc. to develop product placement, themes and other content.

Figure 9C:
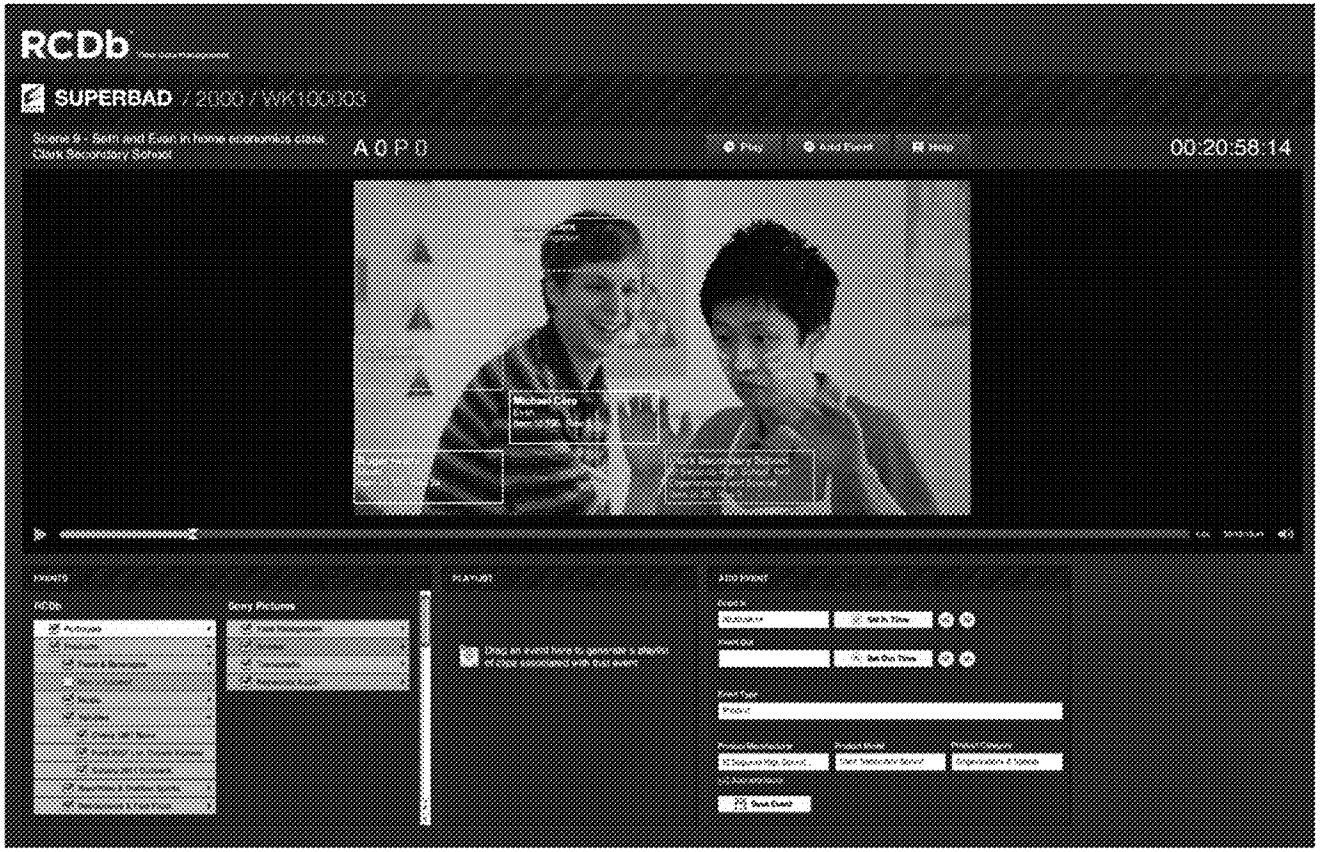

For example, referring to FIG. 9C, a user may be able to check the relevant information in a particular scene such as items of clothing worn by the actors, information regarding the character played by the actor, and/or a story line associated with the scene. Additionally, the user interface tool of FIG. 9C may present metadata information 115 as an overlay to the media file 102. As such, a manual operator may verify the accuracy of the metadata mapping to the time stamps 113. Additionally, the manual operator may also determine the relevance of the information to the content of the media. In such embodiments, the user interface tool is dynamic, and the visual elements of the interface appear and disappear as the timeline of the media 115 is traversed.

Referring to FIG. 9C, a web based tool may be provided to enable the manual operator to selectively verify information in a particular scene. For example, the manual operator may be able to select one or more categories of the supplemental content to verify (e.g., products, portrayals etc.). As a result, only information corresponding to the selected categories will be displayed. Additionally, the manual operator may be able to add events and/or content using this tool.

Second Screen Examples

Figure 10A:
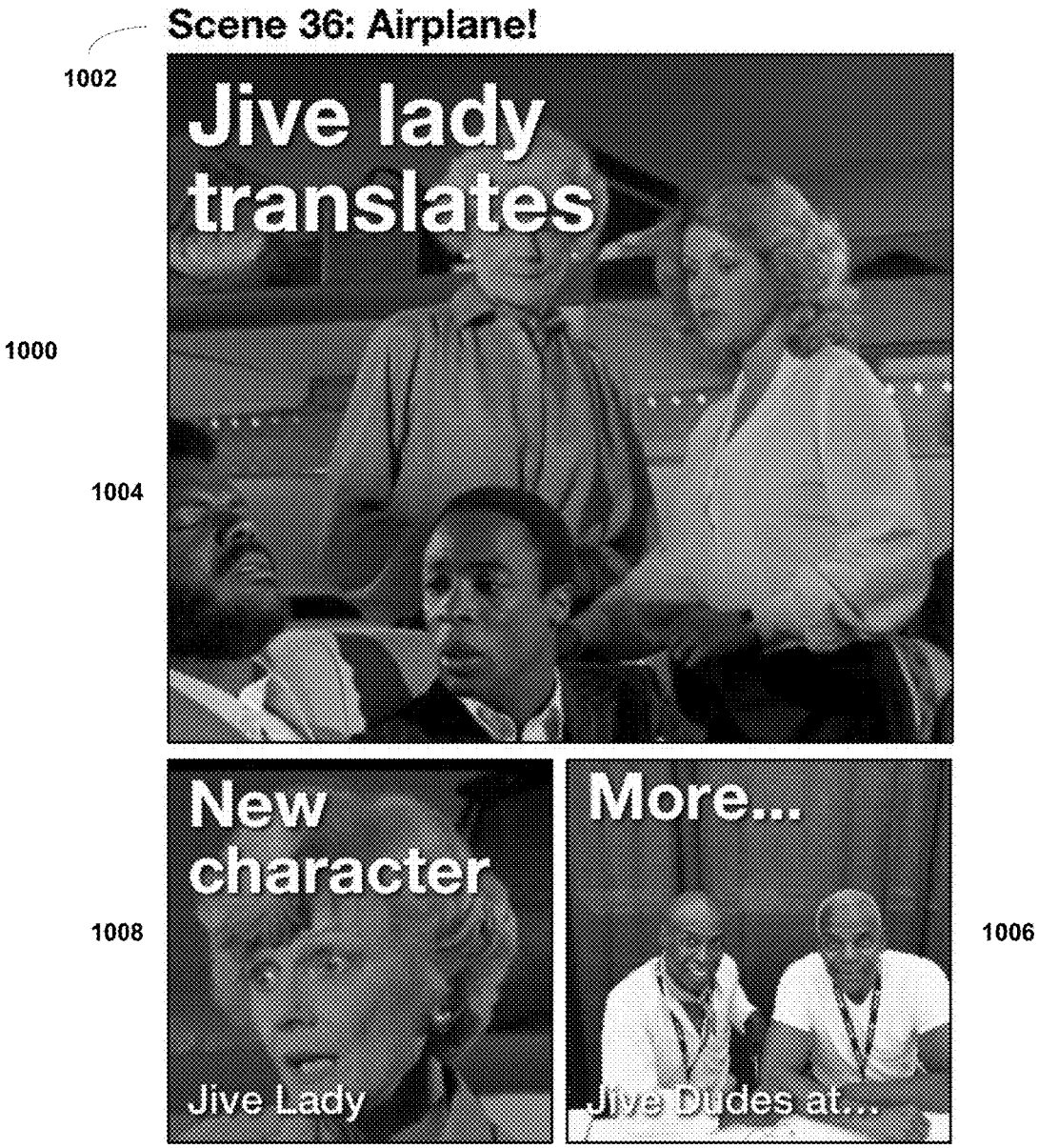
FIG. 10A-10B illustrate examples of media content interfaces generated using metadata content for a paired device, according to embodiments described herein.
Figure 10B:
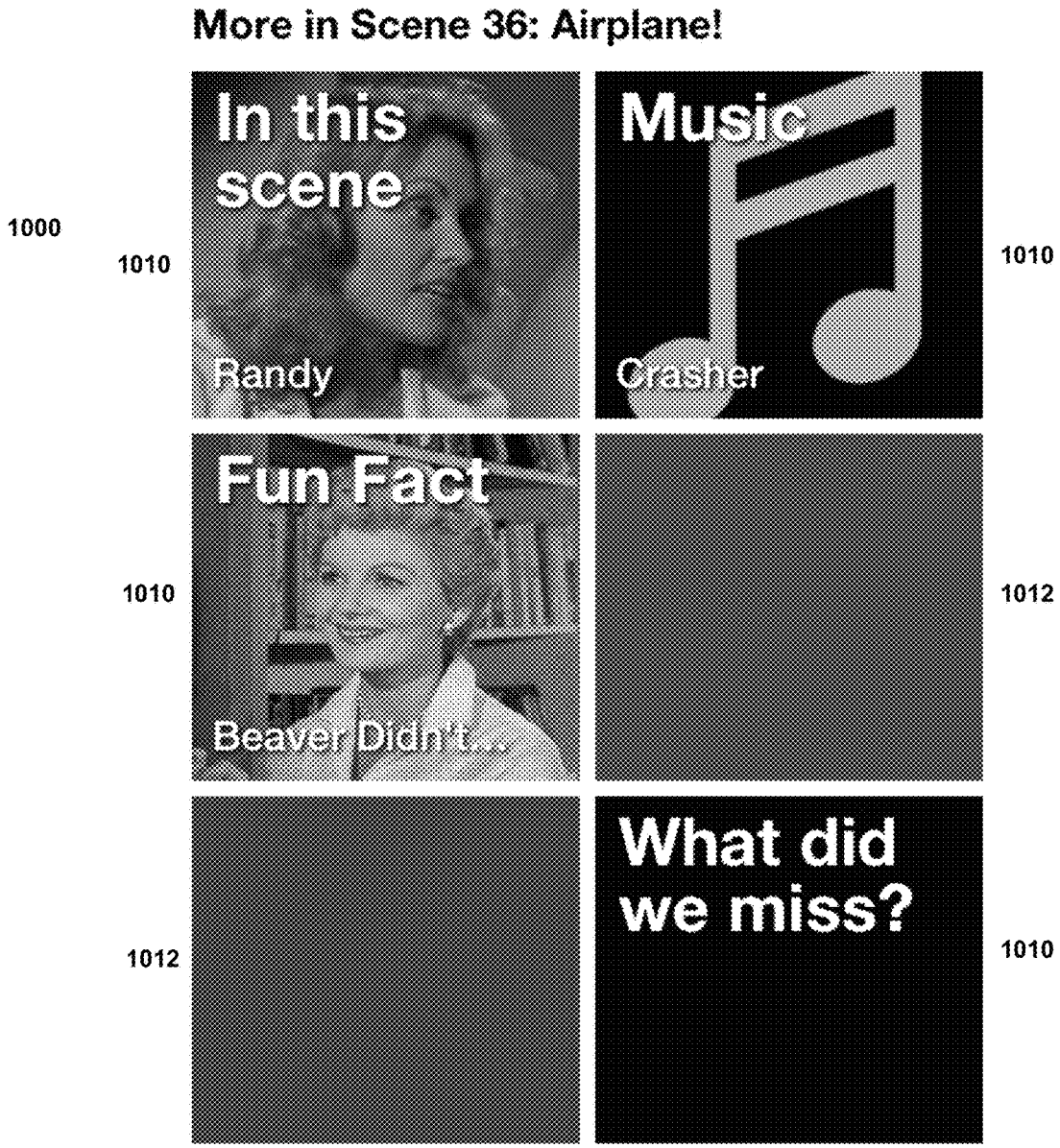

FIG. 10A-10B illustrate examples of media content interfaces generated using metadata content for a paired device, according to embodiments described herein. As discussed above regarding FIG. 1, a paired device 160 may receive time based metadata, such as from metadata service 120, in connection with corresponding media being rendered or played back on a user playback device 158. Embodiments provide for the programmatic services on the paired device 1000 (e.g. a phone, tablet or personal computer) receiving metadata corresponding to a media being rendered or played back on a main playback device, and providing selectable features to enable a user to access supplemental content related to the received metadata in an interface 1000. The interfaces of FIGS. 10A and 10B may be in lieu of or in addition to any interfaces displayed on the main playback device. An indicator 1002 may be provided to specify to a user that the features being displayed include content relating to the media playback, relative to the beginning and end of the media.

The interfaces of FIG. 10A-10B include a plurality of selectable features 1004 that relate to persons or objects appearing in the media. The features include graphical and/or text content that describe persons or objects appearing in the media being rendered or played back on the user playback device, and further describe supplemental content which may be generated and displayed in response to a user selection of the feature. For example, the graphical content of the feature may include an image from the media being rendered or played back on the user playback device, and when selected may cause the interface to be removed and a supplemental content (e.g. graphic and/or text content) relating to the media and/or feature to be displayed on the paired device. For example, generating the supplemental content may include, in response to a user selection of a selectable feature, causing a larger version of the image and a text caption to be displayed on the paired device.

In the embodiment of FIG. 10A, a series of features 1004, 1006 and 1008 are displayed on the interface 1000. Embodiments provide for the features to be selectable by a user. For example, where the paired device is a mobile computing device that includes a touch screen display, and the interface 1000 is provided on the touch screen display, in an embodiment the user may select a particular feature by touching the portion of the screen corresponding to the selectable feature. In such embodiments, service 120 can detect selection of the feature and provide supplemental content on the main playback device and/or on the paired device 1000 corresponding to the selected feature. The supplemental content may include, for example, information about actors or objects that relate to a description of the selected feature, and the information may be displayed on the paired device. For example, in response to selection of feature 1006, the service 120 may cause content to be displayed on the paired device relating to characters who appear in the scene and/or the graphic of the feature.

FIG. 10B illustrates a media content interface in an embodiment of the invention. A series of selectable features 1010 are displayed on the interface. When selected, the selectable features 1010 may cause supplemental content to be displayed on the user playback device and/or the paired device. The example of solid-square features 1012, which display solid squares without any graphical or text content, may be replaced with selectable features 1010 by programmatic services on the paired device including graphical and/or text content based on time based metadata such as supplied by metadata services 120. Similarly, the selectable features 1010 may be replaced by solid-squares features 1012 (or other selectable features) based on the time based metadata.

Link Sharing

Figure 11:
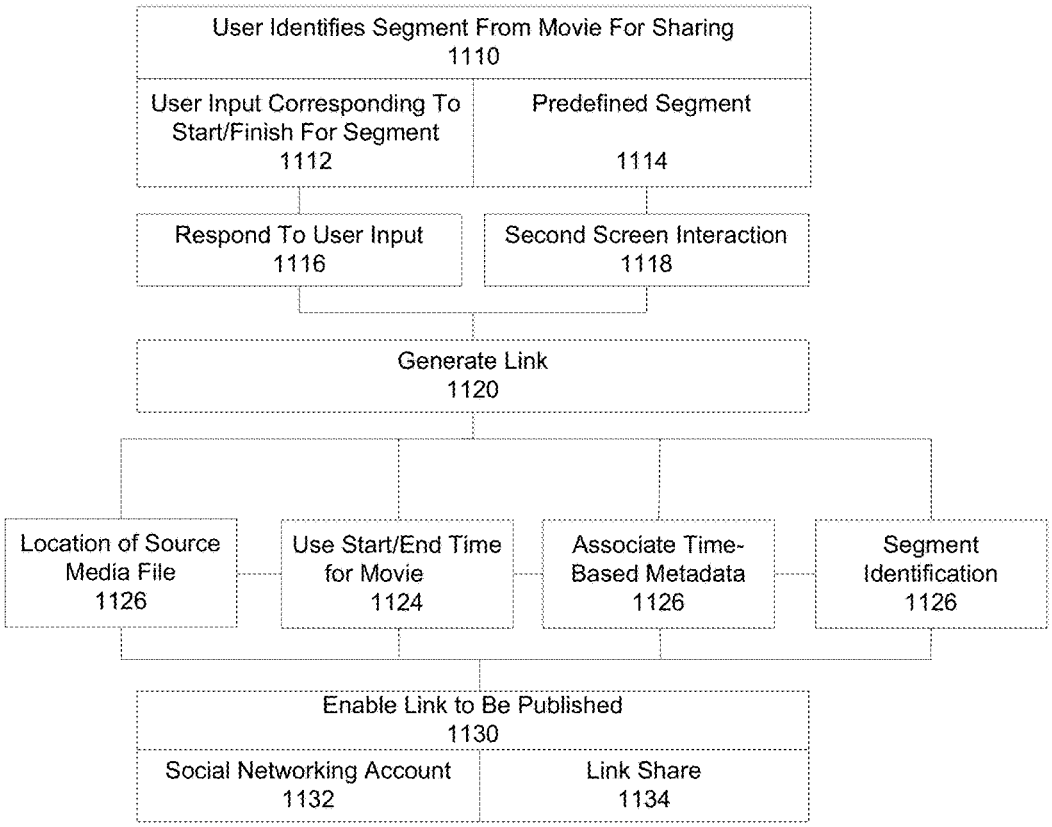
FIG. 11 illustrates a method for providing media data to be shared or published, according to an embodiment.

FIG. 11 illustrates a method for providing media data to be shared or published, according to an embodiment. A method such as described by an embodiment of FIG. 11 can be implemented using components such as described with other embodiments (e.g., a system of FIG. 1). Accordingly, reference may be made to elements of FIG. 1 for purpose of illustrating suitable components for performing a step or sub-step being described.

With reference to FIG. 11, a user identifies a movie segment to share (1110). Referring to FIG. 1, for example, a user can specify input that corresponds to the movie segment using user playback device 158 and/or on the paired device 160 (1112). The input can identify the start/finish times, in reference to a movie's runtime. In this way, the timing specification can designate a beginning time and an end time of the movie segment.

In some variations, the user input can identify a predefined segment (1114). The predefined segment may have a set of predefined features, for example a predefined start/finish time.

The user playback device 158 and/or the paired device 160 may respond to the user input, by, for example, communicating the identified segment to a service or set top box, etc. (1116). The paired device 1160 can, for example, determine, from user input, the start/end times for a movie, and then communicate the start/end times (along with an identifier of the movie) to the service or set top box.

In some variations, for example, a user can operate the paired device 160 in order to provide input that identifies the desired segment (1118). For example, a user's interaction with a second screen (e.g., touch screen) can be used to identify a movie segment or its start and/or end times. In such an embodiment a second screen interaction 1118 may be provided to a user in response to determine, for example, a predefined segment. Various other input mechanisms and/or interfaces can be used to enable a user to specify an input corresponding to a segment of the movie.

After responding to a user input and/or second screen interaction, a link is generated (1120). The link may be generated to include, for example, data elements that provide or correspond to one or more of the following: (i) data that identifies a location of source file for the movie or movie segment (1122), (ii) start and end times for the segment (1124), (iii) time-based metadata that is associated with the segment of the movie (persons and/or objects that appear or are referenced in the identified segment) (1126). In some variations, an identifier for the movie segment can be identified by the link. As an example, the link can be a selectable hypertext link that, when triggered, causes the identified movie segment 1110 to be played or otherwise displayed. The generated link can be published (1130). This can include publishing the link on a social networking account (1132) (e.g. Facebook, or any social network known in the art) or sharing the link through messaging (1134). For example, the link can be shared by sending the link by e-mail, text message, or another direct form of communication.

FIG. 12A-12E illustrate example interfaces for providing media data to be shared or published, according to an embodiment. In the example provided, the interfaces can be provided for use on, for example, a mobile computing device or tablet. For example, in FIG. 12A, the interface 1210 can enable a user to provide inputs through interaction with, for example, a mobile computing device 1200. In some examples, the mobile computing device (or tablet or other computing device) can operate as a second screen.

In the example provided, the user triggers a selectable feature 1210. The feature 1210 can programmed to, for example, identify a segment, or alternatively provide user input that identifies a start/finish for the movie segment. In the example provided, once the segment is identified, time-based metadata (e.g., related shopping panel 1214) can be displayed to the user. The user input can also be used to enable the user to publish the clip 1215 of the segment. For example, the user can communicate the clip 1215 to the service, either with or without, for example, the time-based or rich metadata.

Figure 12A:
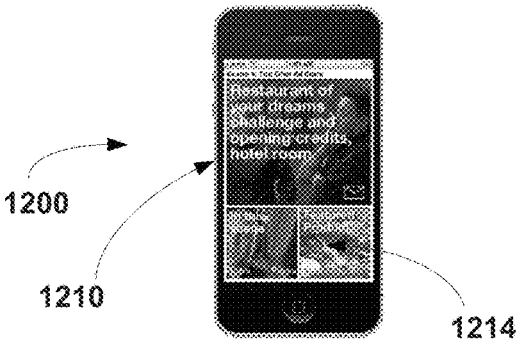
FIG. 12A-12E illustrate example interfaces for providing media data to be shared or published, according to an embodiment.
Figure 12B:
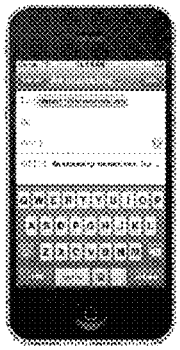

FIG. 12B illustrates an interface where a user initiates sharing or publishing of the clip 1215 by preparing an email message. The user may designate a recipient of the email message. A subject line can optionally be automatically pre-populated based on, for example, metadata associated with the selected segment or movie.

Figure 12C:
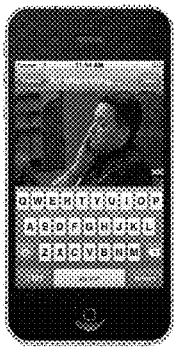

FIG. 12C illustrates an interface where the user may view an image for inclusion in the email message. The image may, for example, correspond to a frame from the clip.

Figure 12D:
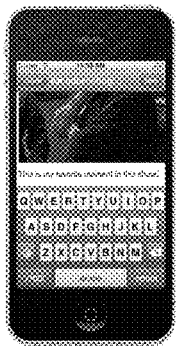

In FIG. 12D, the interface can enable the user to provide commentary, such as a text comment, with the link that is shared. For example, the text commentary can be provided with an email message. For example, a user may provide a comment ("This is my favorite moment in this show") which will be included in the email message. In variations, the interface can enable the user to provide the commentary in connection with a link that is published on, for example, a social networking account.

Figure 12E:
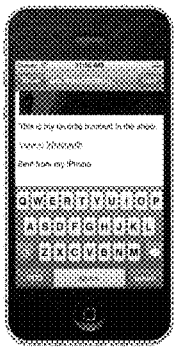

FIG. 12E illustrates an interface where the user has shared the clip by sending the email message. The message included an image corresponding to the clip, a text comment prepared by the user, and the published link.

Computer System

Figure 13:
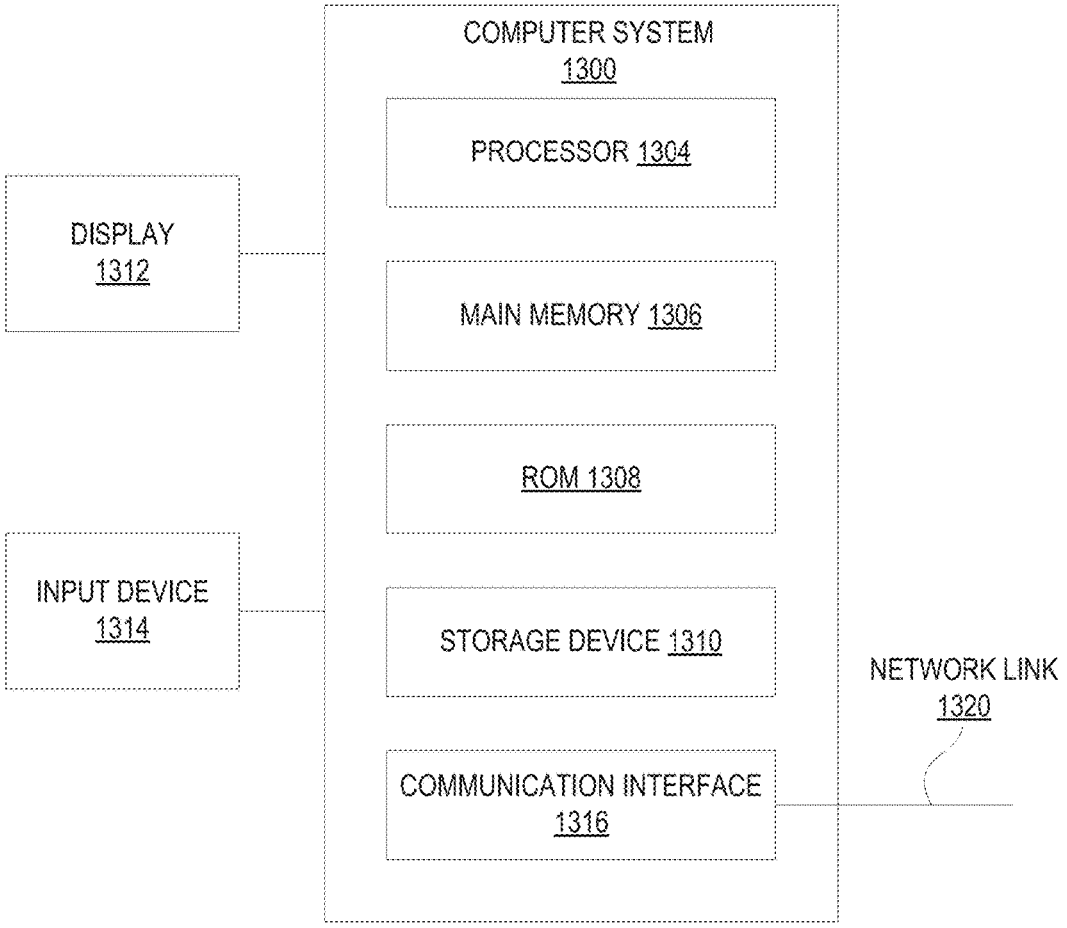
FIG. 13 is a block diagram that illustrates a computer system upon which embodiments described herein may be implemented.

FIG. 13 is a block diagram that illustrates a computer system upon which embodiments described herein may be implemented. For example, in the context of FIG. 1A, system 100 may be implemented using a computer system such as described by FIG. 13. In particular, service 120 (or portions thereof) may be implemented on a computer system such as shown and described with FIG. 13. The computer service 120 may communicate with playback devices, paired devices and/or distribution sources of media content and/or associated metadata using a network such as the Internet.

Additionally, a metadata generation sub-system 110 may be implemented using a computing system such as shown and described by FIG. 13.

In an embodiment, computer system 1300 includes processor 1304, main memory 1306, ROM 1308, storage device 1310, and communication interface 1316. Computer system 1300 includes at least one processor 1304 for processing information. Computer system 1300 also includes a main memory 1306, such as a random access memory (RAM) or other dynamic storage device, for storing information and instructions to be executed by processor 1304. Main memory 1306 also may be used for storing temporary variables or other intermediate information during execution of instructions to be executed by processor 1304. Computer system 1300 may also include a read only memory (ROM) 1308 or other static storage device for storing static information and instructions for processor 1304. A storage device 1310, such as a magnetic disk or optical disk, is provided for storing information and instructions. The communication interface 1316 may enable the computer system 1300 to communicate with one or more networks through use of the network link 1320.

Computer system 1300 can include display 1312, such as a cathode ray tube (CRT), a LCD monitor, and a television set, for displaying information to a user. An input device 1314, including alphanumeric and other keys, is coupled to computer system 1300 for communicating information and command selections to processor 1304. Other non-limiting, illustrative examples of input device 1314 include a mouse, a trackball, or cursor direction keys for communicating direction information and command selections to processor 1304 and for controlling cursor movement on display 1312. While only one input device 1314 is depicted in FIG. 13, embodiments may include any number of input devices 1314 coupled to computer system 1300.

Embodiments described herein are related to the use of computer system 1300 for implementing the techniques described herein. According to one embodiment, those techniques are performed by computer system 1300 in response to processor 1304 executing one or more sequences of one or more instructions contained in main memory 1306. Such instructions may be read into main memory 1306 from another machine-readable medium, such as storage device 1310. Execution of the sequences of instructions contained in main memory 1306 causes processor 1304 to perform the process steps described herein. In alternative embodiments, hard-wired circuitry may be used in place of or in combination with software instructions to implement embodiments described herein. Thus, embodiments described are not limited to any specific combination of hardware circuitry and software.

Although illustrative embodiments have been described in detail herein with reference to the accompanying drawings, variations to specific embodiments and details are encompassed by this disclosure. It is intended that the scope of embodiments described herein be defined by claims and their equivalents. Furthermore, it is contemplated that a particular feature described, either individually or as part of an embodiment, can be combined with other individually described features, or parts of other embodiments. Thus, absence of describing combinations should not preclude the inventor(s) from claiming rights to such combinations.

What is claimed is:

1. A method comprising:

receiving media content;

causing playback of at least a portion of the media content;

determining, based on the playback of at least the portion of the media content, an audio fingerprint;

transmitting a request for metadata, wherein the request comprises the determined audio fingerprint;

receiving, in response to the request, time-based metadata associated with the media content, wherein the time-based metadata comprises a plurality of time stamps that are triggerable at different instances of a timeline of the media content, and wherein one or more time stamps of the plurality of time stamps are associated with corresponding metadata content;

receiving, based on the playback of the at least the portion of the media content, an indication of occurrence of one or more events in the timeline of the media content; and triggering, based on the indication of occurrence of the one or more events, a sequence of time stamps of the plurality of time stamps, wherein the triggered sequence of time stamps is synchronized with the occurrence of the one or more events in the timeline of the media content;

wherein triggering the sequence of time stamps causes determining associated information for one or more time stamps of the sequence of time stamps, and rendering at least a portion of the metadata content based on the associated information; and wherein the associated information for one or more of the time stamps of the sequence of time stamps comprises a link to the portion of the metadata content.

2. The method of claim 1, wherein the rendered portion of the metadata content comprises an interactive user feature configured to be displayed for user input at a particular instance in the timeline of the media content.

3. The method of claim 2, further comprising linking the interactive user feature to a service to enable the user to purchase a preselected item from an online store.

4. The method of claim 1, wherein the rendering at least a portion of the metadata content comprises causing the portion of the metadata content to overlay the playback of the media content, wherein the metadata content is associated with a soundtrack of the media content.

5. The method of claim 1, wherein the metadata content comprises an advertisement.

6. The method of claim 1, wherein at least a portion of the associated information is associated with a geographic location of a storyline of the media content.

7. The method of claim 1, wherein the media content is packaged with the time-based metadata for delivery to media playback devices.

8. The method of claim 7, wherein the packaged media content originated from a head end, and wherein the media content is a broadcast.

9. A method comprising:

receiving media content;

causing playback of at least a portion of the media content;

determining, based on the playback of at least the portion of the media content, an audio fingerprint;

transmitting a request comprising an indication of the determined audio fingerprint;

receiving, in response to the request, time-based metadata corresponding to a timeline of the media content, wherein the time-based metadata comprises a plurality of time stamps that are triggerable at different instances of the timeline, wherein one or more time stamps of the plurality of time stamps are associated with corresponding metadata content;

receiving, based on the playback of the at least the portion of the media content, an indication of occurrence one or more events in the timeline of the media content; and triggering, based on the indication of occurrence of the one or more events, a sequence of time stamps of the plurality of time stamps, wherein the triggered sequence of time stamps is synchronized with occurrences of the one or more events in the timeline of the media content, wherein the triggering the sequence of time stamps causes at least a portion of the metadata content to be rendered.

10. The method of claim 9, wherein the media content is received from a first source and the time-based metadata is received from a second source distinct from the first source.

11. The method of claim 9, wherein the determining an audio fingerprint comprises recording an audio output associated with the playback of the media content.

12. The method of claim 9, wherein the one or more events comprise a scene change in the playback of the media content.

13. The method of claim 9, wherein the one or more events comprise an audio change associated with the playback of the media content.

14. The method of claim 9, wherein the metadata content comprises an advertisement.

15. The method of claim 9, wherein the metadata content is contextually related to the media content.

16. A method comprising:

receiving media content;

causing playback of at least a portion of the media content;

determining, based on the playback of at least the portion of the media content, an audio fingerprint;

transmitting a request comprising an indication of the determined audio fingerprint;

receiving, in response to the request, time-based metadata comprising a plurality of time stamps associated with a timeline of the media content, wherein one or more of the plurality of time stamps are associated with corresponding metadata content;

receiving, based on the playback of the at least the portion of the media content, an indication of occurrence of one or more events in the timeline of the media content;

determining, based on the indication of occurrence of one or more events in the timeline of the media content, one or more time stamps of the plurality of time stamps; and causing, based on the determined one or more time stamps, at least a portion of the metadata content to be rendered.

17. The method of claim 16, wherein the media content is received from a first source and the time-based metadata is received from a second source distinct from the first source.

18. The method of claim 16, wherein the determining an audio fingerprint comprises recording an audio output associated with the playback of the media content.

19. The method of claim 16, wherein the one or more events comprise a scene change in the playback of the media content.

20. The method of claim 16, wherein the one or more events comprise an audio change associated with the playback of the media content.

* * * * *